United States Patent
Takemoto

(10) Patent No.: US 9,645,369 B2
(45) Date of Patent: May 9, 2017

(54) ZOOM LENS AND IMAGE PICKUP APPARATUS INCLUDING THE SAME

(71) Applicant: CANON KABUSHIKI KAISHA, Tokyo (JP)

(72) Inventor: Shoichi Takemoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 86 days.

(21) Appl. No.: 14/685,768

(22) Filed: Apr. 14, 2015

(65) Prior Publication Data

US 2015/0316755 A1 Nov. 5, 2015

(30) Foreign Application Priority Data

May 1, 2014 (JP) ................. 2014-094609

(51) Int. Cl.
```
G02B 15/14      (2006.01)
G02B 9/34       (2006.01)
G02B 15/173     (2006.01)
G02B 15/16      (2006.01)
G02B 15/163     (2006.01)
G02B 15/167     (2006.01)
```

(52) U.S. Cl.
CPC ........... *G02B 15/173* (2013.01); *G02B 15/16* (2013.01); *G02B 15/163* (2013.01); *G02B 15/167* (2013.01)

(58) Field of Classification Search
CPC .... G02B 15/16; G02B 15/163; G02B 15/167; G02B 15/173

USPC ....... 359/683, 684, 686, 687, 754, 772, 774, 359/779

See application file for complete search history.

(56) References Cited

U.S. PATENT DOCUMENTS

2013/0286276 A1* 10/2013 Kawamura ............ G02B 15/14
  348/345

FOREIGN PATENT DOCUMENTS

JP   2004-085846 A   3/2004
JP   2007-139858 A   6/2007

* cited by examiner

*Primary Examiner* — Bumsuk Won
*Assistant Examiner* — Collin X Beatty
(74) *Attorney, Agent, or Firm* — Carter, DeLuca, Farrell & Schmidt, LLP

(57) ABSTRACT

A zoom lens includes, in order from an object side to an image side: a first lens unit having a positive refractive power that does not move for zooming; a second lens unit having a negative refractive power that moves during zooming; a third lens unit having a positive refractive power that moves during zooming; and at least one lens unit having a positive refractive power, and focal lengths of the zoom lens at a wide angle end and a telephoto end, a maximum value of a half angle of field at the wide angle end, and products of lateral magnifications of lens units arranged on the image side of the third lens unit in a state in which focus is at infinity at the telephoto end and the wide angle end are appropriately set.

8 Claims, 14 Drawing Sheets

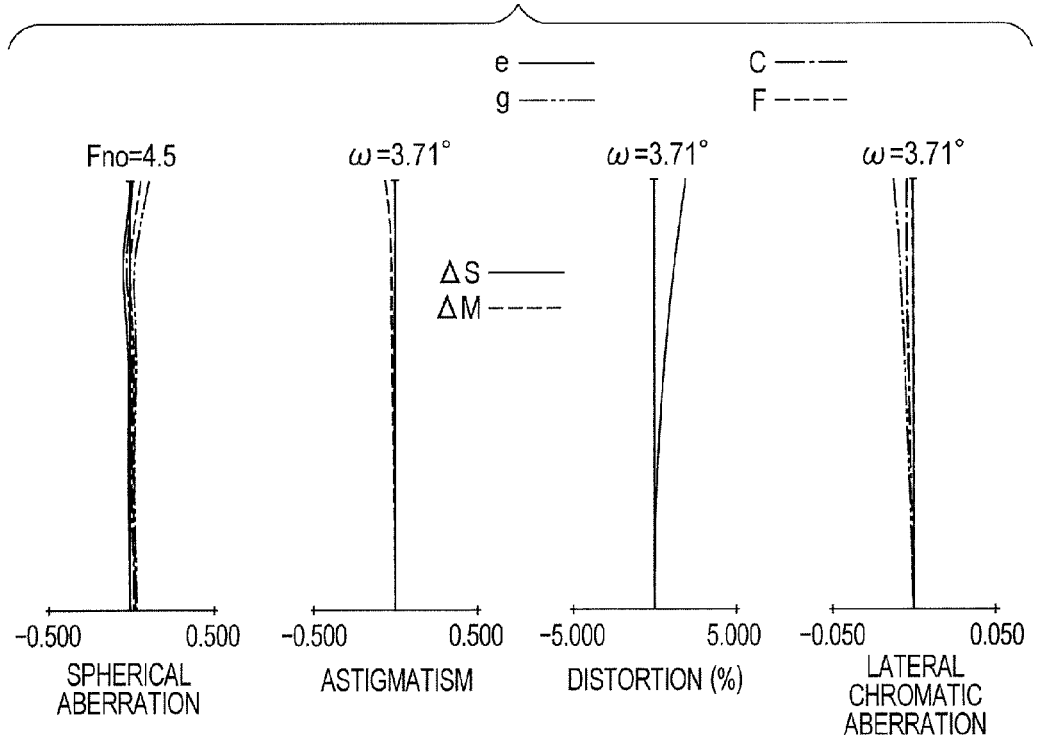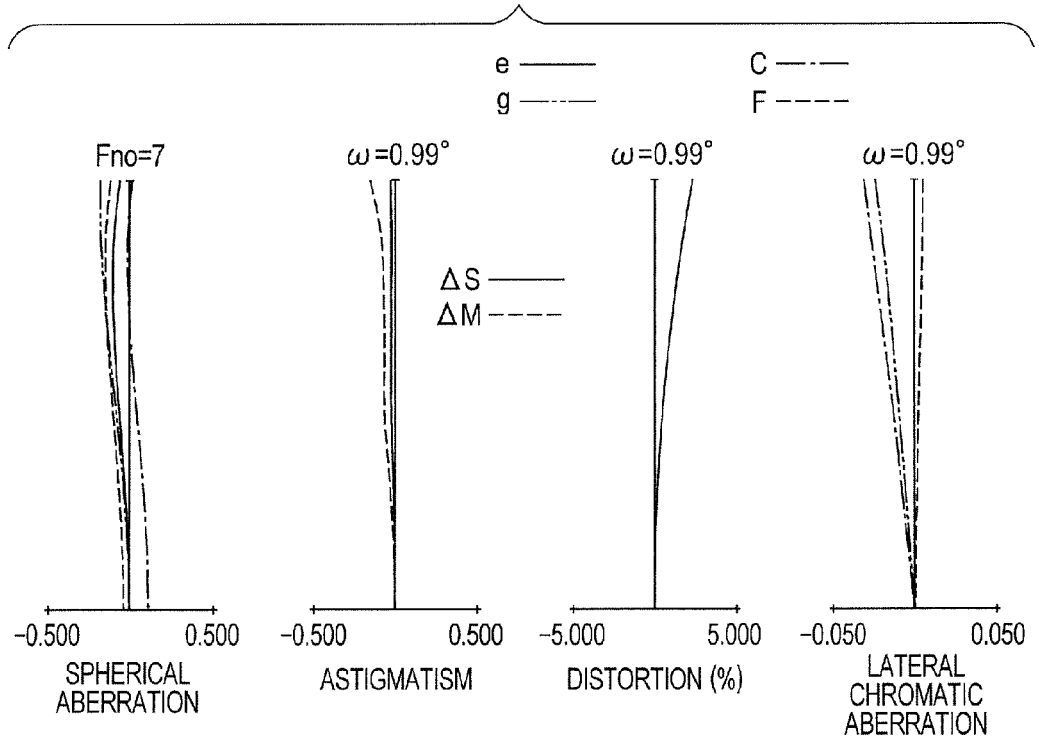

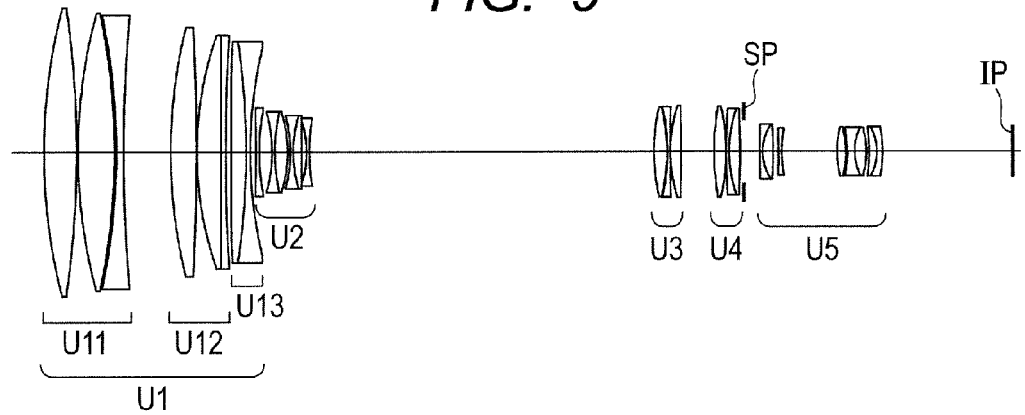
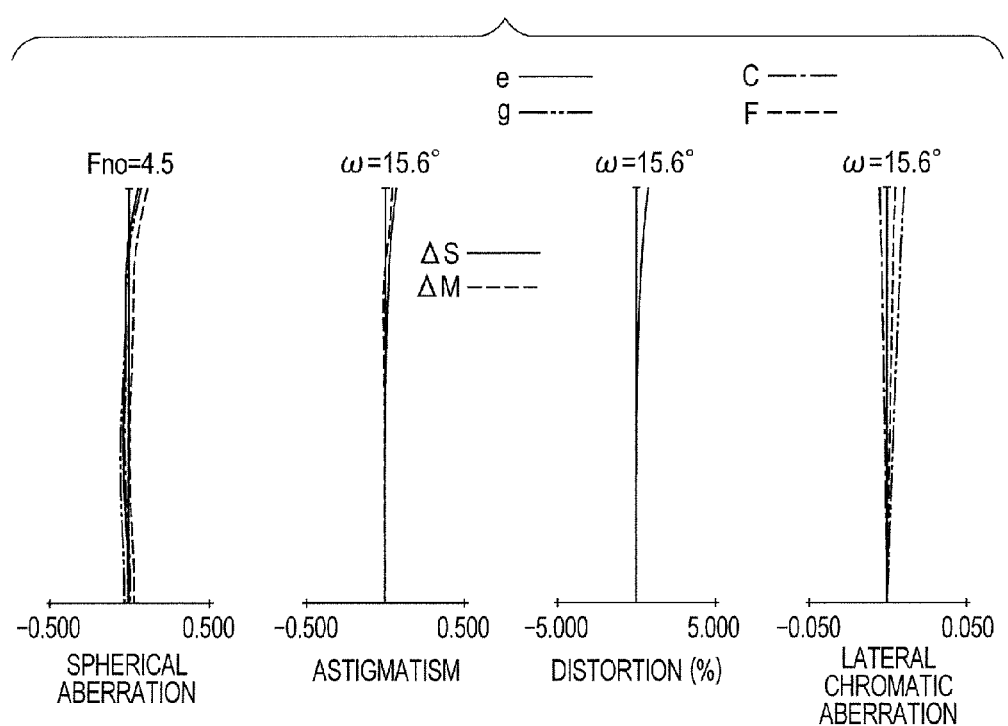

ZOOM LENS AND IMAGE PICKUP APPARATUS INCLUDING THE SAME

BACKGROUND OF THE INVENTION

Field of the Invention

The present invention relates to a zoom lens suitable for a television camera, a video camera, a film camera, a broadcasting television camera, and a movie camera, and more particularly, to a telephoto zoom lens having a large aperture and a high magnification.

Description of the Related Art

In a case where a nature program or the like is photographed for television (for example, an animal, a bird, or the like is photographed outdoors from a long distance), a zoom lens that is usable up to a focal length in a super telephoto range at a high magnification (for example, a high magnification of 7× or more and a half angle of field of 3 degrees or less at a telephoto end) and has high optical performance is required. In such photographing, a camera is often carried on a shoulder for photographing, and hence a zoom lens that is smaller in size and weight and has good portability is required. Moreover, in recent years, in addition to related-art video cameras and broadcasting television cameras, opportunities of photographing moving images are increasing as in a case where a camera for still photography, such as a single lens reflex camera, is also used for photographing a moving image. With a zoom lens for photographing a moving image, a zoom operation or a focus operation is performed during photographing, and hence in a case where a total lens length is changed at the time of the operation, an operation sound becomes noise to affect the photography, which is undesirable. Therefore, a demand for a zoom lens in which a first lens unit is fixed during zooming and which is of an inner focus type is increasing as a zoom lens suitable for moving image photography. In general, a size of a sensor (image pickup element) of the single reflex camera is larger than one inch, and is larger than a sensor having a size of one inch or less, which is mainly used in a video camera or a broadcasting television camera. Therefore, there is an increasing demand for the zoom lens having the high magnification and being usable in the super telephoto range, which is compatible with such a large sensor as to exceed one inch, good in portability and functionality, and suitable for moving image photography.

In Japanese Patent Application Laid-Open No. 2007-139858, there is proposed a telephoto zoom lens including four lens units, which has an angle of field of about 0.7 degrees at the telephoto end and a magnification of about 15×, and is suitable for a ⅔-inch broadcasting television camera.

In Japanese Patent Application Laid-Open No. 2004-085846, there is proposed a zoom lens including four lens units, which has an angle of field of about 1.6 degrees at the telephoto end and a magnification of about 3×.

In regard to the zoom lens described in Japanese Patent Application Laid-Open No. 2007-139858, as a problem in adapting to a still larger image pickup element and increasing a magnification while maintaining a large aperture ratio, an effective diameter on an image side of a zoom lens unit is increased, and hence the entire zoom lens is difficult to downsize.

In regard to the zoom lens described in Japanese Patent Application Laid-Open No. 2004-085846, as a problem in further increasing the magnification, a movement amount of a third lens unit for correcting an image plane is difficult to suppress, and in addition, a total lens thickness of a first lens unit is large, with the result that the entire zoom lens is difficult to downsize.

SUMMARY OF THE INVENTION

It is an object of the present invention to provide a zoom lens in which a paraxial refractive power arrangement of a first lens unit and a zoom lens unit is appropriately defined, which has a high magnification and is usable in a super telephoto range (for example, a high magnification of 7× or more and a half angle of field of 3 degrees or less at a telephoto end), and which is small in size and weight even in a case of adapting to a large sensor (for example, one inch or more).

In order to achieve the above-mentioned object, according to one embodiment of the present invention, there is provided a zoom lens, including, in order from an object side to an image side: a first lens unit having a positive refractive power that does not move for zooming; a second lens unit having a negative refractive power that moves during zooming; a third lens unit having a positive refractive power that moves during zooming; and at least one lens unit having a positive refractive power, in which the following conditions are satisfied:

$$0.02 < LN(|\beta ct/\beta cw|)/LN(ft/fw) < 0.50$$

$$2.0 < ft/f1 < 7.0$$

$$20 < ft/(fw \times \tan \omega w) < 120$$

where fw and ft represent focal lengths of the zoom lens at a wide angle end and a telephoto end, respectively, ωw represents a maximum value of a half angle of field at the wide angle end, βct and βcw represent products of lateral magnifications of lens units arranged on the image side of the third lens unit in a state in which focus is at infinity at the telephoto end and the wide angle end, respectively, and LN( ) in the conditional expression represents a natural logarithm of a numerical value in parentheses.

According to the one embodiment of the present invention, it is possible to achieve the zoom lens which has the high magnification and is usable in the super telephoto range (for example, the high magnification of 7× or more and the half angle of field of 3 degrees or less at the telephoto end), and which is small in size and weight even in the case of adapting to the large sensor (for example, one inch or more).

Further features of the present invention will become apparent from the following description of exemplary embodiments with reference to the attached drawings.

BRIEF DESCRIPTION OF THE DRAWINGS

FIG. 4B is a longitudinal aberration diagram when focus is at infinity at a focal length of 240 mm in the zoom lens according to Embodiment 2.

FIG. 4C is a longitudinal aberration diagram when focus is at infinity at the telephoto end in the zoom lens according to Embodiment 2.

FIG. 9 is a lens cross-sectional view when focus is at infinity at the wide angle end in a zoom lens according to Embodiment 5.

FIG. 10A is a longitudinal aberration diagram when focus is at infinity at the wide angle end in the zoom lens according to Embodiment 5.

DESCRIPTION OF THE EMBODIMENTS

Figure 1:
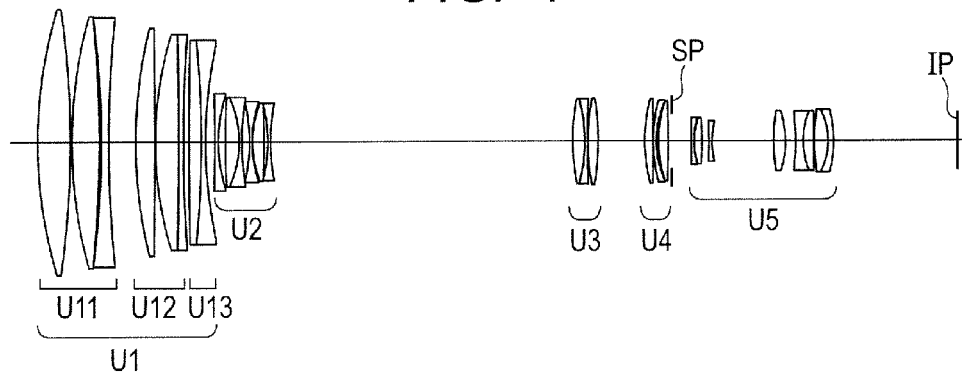
FIG. 1 is a lens cross-sectional view in a state in which focus is at infinity at a wide angle end in a zoom lens according to Embodiment 1.

Now, embodiments of the present invention are described in detail with reference to the accompanying drawings. A zoom lens according to the present invention includes, in order from an object side to an image side, a first lens unit having a positive refractive power that does not move for zooming. The zoom lens also includes a second lens unit having a negative refractive power that moves during zooming, a third lens unit having a positive refractive power that moves during zooming, and at least one positive lens unit. The phrase "lens unit does not move for zooming" as used herein means that the lens unit is not driven for the purpose of performing zooming but may move for focusing in a case where the zooming and the focusing are performed at the same time.

With a zoom lens according to each embodiment, a relationship of a focal length of the first lens unit and a focal length of the entire zoom lens at a telephoto end, and a magnification sharing ratio of the second and subsequent lens units are appropriately defined to realize reduction in size and weight even in a case of adapting to a large sensor with a zoom lens which has a high magnification and is usable in a super telephoto range. Note that, a format of the sensor as used herein corresponds to a size of an imaging surface of an image pickup element, and generally has a diagonal length of 11 mm for a ⅔-inch sensor and 16 mm for a one-inch sensor.

More specifically, the zoom lens according to the present invention is a zoom lens including, in order from the object side to the image side, a first lens unit having a positive refractive power that does not move for zooming, a second lens unit having a negative refractive power that moves during zooming, a third lens unit having a positive refractive power that moves during zooming, and at least one positive lens unit. Moreover, the following conditions are satisfied:

$$0.02 < LN(|\beta ct/\beta cw|)/LN(ft/fw) < 0.50 \tag{1}$$

$$2.0 < ft/f1 < 7.0 \tag{2}$$

$$20 < ft/(fw \times \tan \omega w) < 120 \tag{3}$$

where fw and ft represent focal lengths of the zoom lens at a wide angle end and the telephoto end, respectively, ωw represents a maximum value of a half angle of field at the wide angle end, and βct and βcw represent products of lateral magnifications of the third lens unit and the subsequent lens units in a state in which focus is at infinity at the telephoto end and the wide angle end, respectively.

Note that, LN( ) in the conditional expression represents a natural logarithm of a numerical value in parentheses.

The conditional expression (1) defines a relationship of products βcw and βct of the lateral magnifications of the third lens unit and the subsequent lens units at the wide angle end and the telephoto end and ft/fw, which is a magnification of the zoom lens, and hence defines a magnification sharing ratio of the third lens unit and the subsequent lens units.

When LN(|βct/βcw|)/LN(ft/fw) in the conditional expression (1) exceeds an upper limit, the magnification sharing ratio of the third and subsequent lens units becomes too large. The third lens unit and the subsequent lens units are configured to have a weaker refractive power than the second lens unit, and hence movement amounts of the third and subsequent lens units become large for obtaining a predetermined magnification sharing ratio, which makes it difficult to reduce a total lens length. When LN(|βct/βcw|)/LN(ft/fw) in the conditional expression (1) falls below a lower limit, a movement amount of the second lens unit, which is a main zoom lens unit, becomes too large, with the result that variations in lateral chromatic aberration and image plane aberration generated in the second lens unit become large, which makes it difficult to obtain high performance.

Next, the conditional expression (2) defines a ratio of a focal length f1 of the first lens unit and the focal length ft at the telephoto end. When f1 and ft are in an appropriate relationship, a longitudinal chromatic aberration, which is problematic in a zoom lens that is usable up to the telephoto range, and a focus shift during zooming, which is problematic in a zoom lens that is usable in a telephoto range and has a high magnification, and is caused by a manufacturing error, may be suppressed.

When ft/f1 in the conditional expression (2) exceeds an upper limit, the focal length of the first lens unit becomes relatively too short with respect to the focal length at the telephoto end, and an enlargement magnification of the first lens unit on a telephoto side becomes too large. In the case where the enlargement magnification of the first lens unit is large, the longitudinal chromatic aberration generated in the first lens unit may no longer be corrected by the second and subsequent lens units, which makes it difficult to obtain high performance on the telephoto side. Further, a lateral magnification of the second lens unit becomes relatively large. In a case where various amounts of the second lens unit, here in particular a focal length, are shifted due to a manufacturing error of the second lens unit, the shift in focal length of the second lens unit also affects an image plane position. Now, when a lateral magnification of the second lens unit is represented by $\beta 2$, a lateral magnification of the subsequent lens units is represented by $\beta c$, and an amount of shift in image position on the second lens unit itself is represented by $\Delta sk2$, a variation in imaging position, which is generated in the second lens unit, is enlarged to an amount of focus shift $\Delta sk$ on an image plane in the following expression.

$$\Delta sk = \Delta sk2 \times (1-\beta 2^2) \times \beta c^2 \quad (x)$$

In regard to the expression (x), in the telephoto zoom lens having a high magnification as in the present invention, magnitudes of both $\beta 2$ and $\beta c$ become larger than 1 at the telephoto end. Therefore, when the lateral magnification of the second lens unit becomes relatively large, the manufacturing error of the second lens unit has a larger effect on the image plane position, with the result that the focus shift due to the zooming becomes difficult to suppress, which affects manufacturability.

When ft/f1 in the conditional expression (2) falls below a lower limit, the focal length of the first lens unit becomes too large, the first lens unit becomes difficult to downsize, and in addition, a spherical aberration and the longitudinal chromatic aberration, which are generated in the first lens unit, are increased and become difficult to correct by the other lens units.

Next, the conditional expression (3) defines a relationship of the focal length fw of the zoom lens at the wide angle end and the half angle of field ωw at the wide angle end with the focal length ft at the telephoto end. The denominator fw×tan ωw of the conditional expression (3) corresponds to a maximum image height at which the zoom lens may be used without a ray being eclipsed.

When ft/(fw×tan ωw) in the conditional expression (3) exceeds an upper limit, the focal length at the telephoto end becomes relatively too long. In this case, with a configuration in the conditional ranges defined by the above-mentioned conditional expressions, a focus movement due to the zooming cannot be suppressed, and further, the longitudinal chromatic aberration at the telephoto end also becomes difficult to correct. When ft/(fw×tan ωw) in the conditional expression (3) falls below a lower limit, with the configuration in the conditional ranges defined by the above conditions, the focal length of the first lens unit becomes relatively large, which makes it difficult to reduce the size and weight of the zoom lens.

It is preferred to set the numerical value ranges of the conditional expressions (1) to (3) as follows:

$$0.05 < LN(|\beta ct/cw|)/LN(ft/fw) < 0.40 \quad (1a)$$

$$2.2 < ft/f1 < 6.0 \quad (2a)$$

$$25 < ft/(fw \times \tan \omega w) < 115 \quad (3a)$$

In each of the embodiments, it is more preferred to satisfy at least one of the following conditions.

The first lens unit includes a front lens unit having a positive refractive power, which includes at least one negative lens, and a rear lens unit having a negative refractive power, which includes one positive lens and one negative lens, and focal lengths of the lens units are represented by f1f and f1r, respectively. Moreover, a length from a surface vertex position of a lens surface closest to the object side to a surface vertex position of a lens surface closest to the image side of the first lens unit is represented by UD1. A lateral magnification of the second lens unit in the state in which focus is at infinity at the wide angle end is represented by β2w. At this time, it is preferred to satisfy at least one of the following conditional expressions:

$$-0.50 < f1f/f1r < -0.20 \quad (4)$$

$$0.27 < UD1/f1 < 0.55 \quad (5)$$

$$-0.35 < \beta 2w < -0.15 \quad (6)$$

Figure 14A:
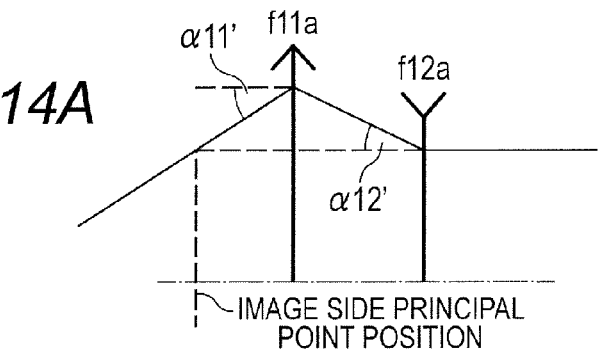
FIG. 14A is a schematic diagram of a paraxial refractive power arrangement of a first lens unit according to the present invention.
Figure 14B:
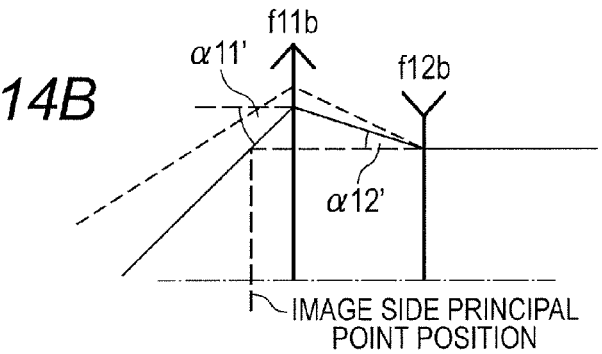
FIG. 14B is a schematic diagram of a paraxial refractive power arrangement of the first lens unit according to the present invention.

The conditional expression (4) defines a relationship of the focal lengths of the front lens unit and the rear lens unit, which form the first lens unit. The front lens unit is configured to have a positive refractive power, the rear lens unit is configured to have a negative refractive power, and a configuration with which the conditional expression (4) is satisfied is adopted, with the result that weights of the first lens unit and the second and subsequent lens units that move during zooming may be reduced. FIGS. 14A and 14B are schematic diagrams illustrating paraxial relationships of the front lens unit and the rear lens unit. In FIGS. 14A and 14B, a ratio of the focal lengths of the sub lens units satisfies the following relationship:

$$f11a/f12a < f11b/f12b \quad (xi)$$

As illustrated in FIGS. 14A and 14B, a ray that is parallel to an optical axis enters from the image side of the first lens unit, and a position on the optical axis of a point at which the ray proceeds to the object side and intersects a ray that has passed through the rear lens unit and the front lens unit is an image side principal point position of the first lens unit.

When the expression (xi) above is satisfied in FIGS. 14A and 14B, the focal length of the rear lens unit becomes relatively strong, with the result that an exit angle α'12 from the rear lens unit illustrated in FIGS. 14A and 14B becomes large, and an exit angle α'11 from the front lens unit becomes small. As a result, the image side principal point position, which is an intersection of the incident ray that is parallel to the optical axis and the exit ray from the front lens unit as illustrated in FIGS. 14A and 14B is displaced toward the object side. As a result of the principal point position being displaced toward the object side, an axial incident ray from the object side is subjected to a converging function more on the object side of the first lens unit, and a lens diameter of a sub lens unit on an exit side of the first lens unit, a diameter of the subsequent second lens unit, and a diameter of a lens barrel or the like holding the subsequent movable lens units may be reduced. In the case where a magnification is high and the focal length at the telephoto end is long as in the present invention, movement amounts of the movable lens units are large, and the lens diameters themselves tend to be very large, and hence the reductions in weight of the movable lens units lead to an improvement in portability, and also to simplification of functions required for driving the lenses.

When f1f/f1r in the conditional expression (4) exceeds an upper limit, the focal length of the rear lens unit becomes relatively too short, and the principal point of the first lens unit is significantly displaced toward the object side. As a result, a ray height of an off-axial ray that passes through a lens on the object side of the first lens unit is increased to increase the lens diameters, which makes the reductions in size and weight difficult. When f1f/f1r in the conditional expression (4) falls below a lower limit, the focal length of the rear lens unit becomes relatively too long, which makes it difficult to displace the principal point of the first lens unit toward the object side. As a result, the principal point of the first lens unit cannot be set to a desired value, and the reductions in size and weight become difficult.

The conditional expression (5) defines a relationship of a distance UD1 from a surface vertex closest to the object side to a surface vertex closest to the image side of the first lens unit and the focal length f1 of the first lens unit.

In a case where UD1/f1 in the conditional expression (5) exceeds an upper limit, a total thickness of the first lens unit becomes too large. The first lens unit is a lens unit having the largest lens diameter of the zoom lens, and when the first lens unit becomes large, the reductions in size and weight of the entire zoom lens become difficult. When UD1/f1 in the conditional expression (5) falls below a lower limit, the total thickness of the first lens unit becomes relatively too small. In this case, the refractive powers of the sub lens units forming the first lens unit become too strong, and amounts of aberrations generated in the sub lens units are increased, with the result that the longitudinal chromatic aberration, the spherical aberration, and coma become difficult to correct especially on the telephoto side.

The conditional expression (6) defines the lateral magnification β2w of the second lens unit when focus is at infinity at the wide angle end.

When β2w in the conditional expression (6) exceeds an upper limit, the lateral magnification of the second lens unit at the wide angle end becomes too large. In order to set the lateral magnification of the second lens unit large, there is a need to set a principal point interval between the first lens unit and the second lens unit large. Therefore, there is a need to make an air interval between the first lens unit and the second lens unit large, with the result that the total lens length becomes long, which makes it difficult to reduce the size and weight of the entire zoom lens. When β2w in the conditional expression (6) falls below a lower limit, the movement amount during zooming becomes large on a wide angle side of the second lens unit, and the first lens unit and the second lens unit move away from a stop surface, with the result that the lens diameters of the first lens unit and the second lens unit increase, which makes it difficult to reduce the size and weight.

It is more preferred to set the numerical value ranges of the conditional expressions (4) to (6) as follows:

$$-0.47<f1f/f1r<-0.25 \quad (4a)$$

$$0.29<UD1/f1<0.47 \quad (5a)$$

$$-0.32<\beta2w<-0.19 \quad (6a)$$

In another aspect of the zoom lens according to the present invention, it is preferred that lens units on the image side of the third lens unit include a fourth lens unit having a positive refractive power that moves during zooming, and a fifth lens unit having a positive refractive power that does not move for zooming. The fourth lens unit is added as a movable lens unit to increase flexibility in correcting the image plane during zooming so that a height of an off-axial incident ray on the first lens unit and ray heights of axial incident rays on the third and fourth lens units may be controlled, with the result that the lens units may be further downsized. Moreover, the fifth lens unit does not move for zooming so that an imaging relationship in the fifth lens unit becomes constant during zooming, with the result that a lens unit having an additional function, such as a vibration isolation unit, may be arranged in the fifth lens unit to simplify the control. In addition, even in a case where a focal length conversion unit such as an extender, which is retractably insertable on the optical axis, is provided in the fifth lens unit, such unit may be provided with a simple mechanism because there is no movable lens unit nearby.

In another aspect of the zoom lens according to the present invention, relative partial dispersions of optical materials to be used for the second lens unit are defined. In this case, the following conditional expression is satisfied:

$$-8.50\times10^{-4}<(\theta2p-\theta2n)/(\nu2p-\nu2n)<-2.00\times10^{-4} \quad (7)$$

where ν2p and θ2p represent average values of Abbe numbers and relative partial dispersions of convex lenses forming the second lens unit, respectively, and ν2n and θ2n represent average values of Abbe numbers and relative partial dispersions of concave lenses, respectively.

Here, the Abbe numbers and the relative partial dispersions of the materials of the optical device (lens) used in the present invention are defined as follows. Refractive indices with respect to a g-Line (435.8 nm), an F-Line (486.1 nm), a d-Line (587.6 nm), and a C-Line (656.3 nm) of Fraunhofer line are denoted by Ng, NF, Nd, and NC, respectively. The Abbe number νd and the relative partial dispersion θgF with respect to the g-Line and the F-Line are defined by the following expressions.

$$\nu d=(Nd-1)/(NF-NC) \quad (i)$$

$$\theta gF=(Ng-NF)/(NF-NC) \quad (ii)$$

The relative partial dispersion θgF of an existing optical material is present in a narrow range with respect to the Abbe number νd. Further, the existing optical material has a tendency that, as the Abbe number νd becomes smaller, the relative partial dispersion θgF becomes greater, that is, as the Abbe number νd becomes larger, the refractive index becomes lower. Here, a condition for correcting a chromatic aberration in a thin contact optical system including two lenses 1 and 2 having refractive powers $\phi 1$ and $\phi 2$ and Abbe numbers $\nu 1$ and $\nu 2$, respectively, is expressed by the following expression.

$$\phi 1/\nu 1 + \phi 2/\nu 2 = E \quad \text{(iii)}$$

In this case, a combined refractive power p of the lenses 1 and 2 is expressed by the following expression.

$$\phi = \phi 1 + \phi 2 \quad \text{(iv)}$$

When E=0 is satisfied in expression (iii), in correcting the chromatic aberration, imaging positions of the C-Line and the F-Line match each other. At this time, $\phi 1$ and $\phi 2$ are expressed by the following expressions.

$$\phi 1 = \phi \times \nu 1/(\nu 1 - \nu 2) \quad \text{(v)}$$

$$\phi 2 = \phi \times \nu 2/(\nu 1 - \nu 2) \quad \text{(vi)}$$

Figure 15:
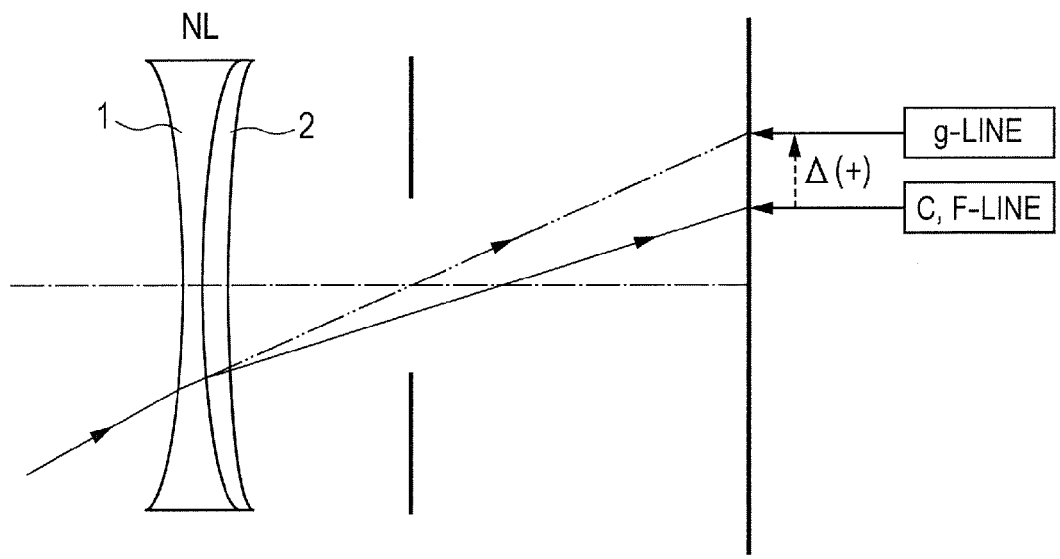
FIG. 15 is a schematic diagram regarding two-color chromatic aberration correction and a remaining secondary spectrum of a lateral chromatic aberration of a negative lens unit.

FIG. 15 is a schematic diagram regarding two-color chromatic aberration correction and a remaining secondary spectrum of a lateral chromatic aberration of a lens unit LN having a negative refractive power and arranged between an object plane and an aperture stop. When the chromatic aberration of the negative lens unit LN illustrated in FIG. 15 is corrected, a material having a large Abbe number $\nu 1$ is used for a negative lens 1, and a material having a small Abbe number $\nu 2$ is used for a positive lens 2. Therefore, the negative lens 1 has a small relative partial dispersion 81 and the positive lens 2 has a large relative partial dispersion 82. When the lateral chromatic aberration is corrected for the C-Line and the F-Line, an imaging point of the g-Line shifts in a direction separated away from the optical axis. If an amount of the shift of the lateral chromatic aberration of the g-Line with respect to the C-Line and the F-Line is defined as a secondary spectrum amount $\Delta Y$, the secondary spectrum amount $\Delta Y$ is expressed by the following expression.

$$\Delta Y = (1/\phi) \times (\theta 1 - \theta 2)/(\nu 1 - \nu 2) \quad \text{(vii)}$$

In order to satisfactorily correct the secondary spectrum of the lateral chromatic aberration over the entire zoom range, it is necessary to adjust an amount of the secondary spectrum of the lateral chromatic aberration generated in the second lens unit, which greatly affects the variations in the lateral chromatic aberration. The second lens unit has the negative refractive power. Hence, in order to satisfactorily correct the variation amount of the secondary spectrum of the lateral chromatic aberration over the entire zoom range, it is necessary to select such a glass material as to reduce the secondary spectrum amount $\Delta Y$ generated in the second lens unit. The condition of the conditional expression (7) is defined so as to reduce an amount of the lateral chromatic aberration generated in the second lens unit. When the condition of an upper limit of the conditional expression (7) is not satisfied, a secondary spectrum of the lateral chromatic aberration is advantageously corrected, but refractive indices of concave lenses forming the second lens unit become low to reduce radii of curvature of the concave lenses. As a result, high order aberrations of a curvature of field and the coma increase, which makes it difficult to achieve good optical performance. When the condition of a lower limit of the conditional expression (7) is not satisfied, the secondary spectrum of the lateral chromatic aberration is increased, which makes it difficult to satisfactorily correct chromatic aberrations. It is more preferred to set the numerical value range of the conditional expression (7) as follows:

$$-7.70 \times 10^{-4} < (\theta 2p - \theta 2n)/(\nu 2p - \nu 2n) < -2.30 \times 10^{-4} \quad \text{(7a)}$$

In a further aspect of the zoom lens according to the present invention, relative partial dispersions of optical materials used in the first lens unit are defined. When average values of Abbe numbers and relative partial dispersions of convex lenses forming the first lens unit are represented by $\nu 1p$ and $\theta 1p$, respectively, and average values of Abbe numbers and relative partial dispersions of concave lenses are represented by $\nu 1n$ and $\theta 1n$, respectively, the following conditional expressions are satisfied:

$$-1.80 \times 10^{-3} < (\theta 1p - \theta 1n)/(\nu 1p - \nu 1n) < -0.80 \times 10^{-3} \quad \text{(8)}$$

Figure 16:
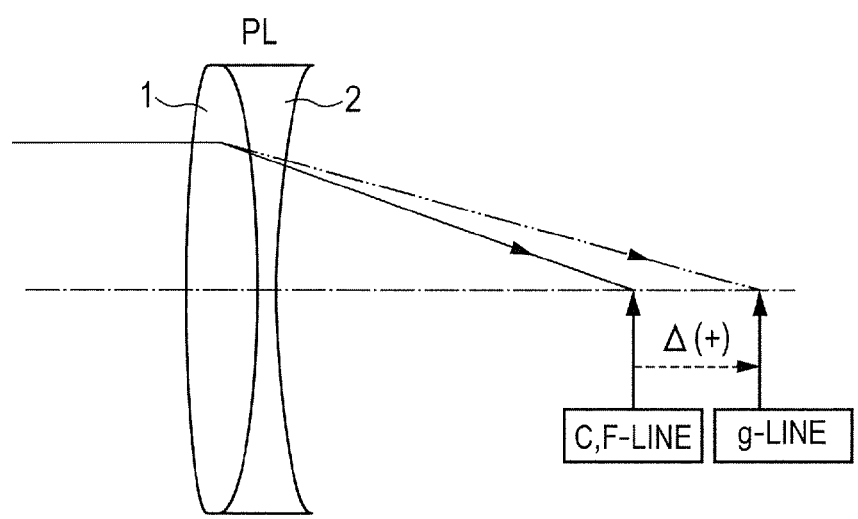
FIG. 16 is a schematic diagram regarding two-color chromatic aberration correction and a remaining secondary spectrum of a longitudinal chromatic aberration of a positive lens unit.

FIG. 16 is a schematic diagram regarding two-color chromatic aberration correction of the longitudinal chromatic aberration by a positive lens unit PL and the remaining secondary spectrum. In FIG. 16, a material having a large Abbe number $\nu 1$ is used for a positive lens 1, and a material having a small Abbe number $\nu 2$ is used for a negative lens 2. Therefore, the positive lens 1 has a small relative partial dispersion 81, and the negative lens 2 has a large relative partial dispersion 82, with the result that when the longitudinal chromatic aberration is corrected by the C-Line and the F-Line, an imaging point of the g-Line is shifted toward the image side. When an amount of shift in the longitudinal chromatic aberration of the g-Line with respect to the C-Line and the F-Line in a case where a ray enters with an object distance being set to infinity is defined as an amount of secondary spectrum $\Delta S$, the amount of secondary spectrum $\Delta S$ is expressed as:

$$\Delta S = -(1/\phi) \times (\theta 1 - \theta 2)/(\nu 1 - \nu 2) \quad \text{(xiii)}$$

In order to satisfactorily correct a secondary spectrum of the longitudinal chromatic aberration at the telephoto end, there is a need to adjust a generation amount of the first lens unit in which the secondary spectrum is generated noticeably. As defined by the conditional expression (7), in an exemplary embodiment of the present invention, an optical material used in the second lens unit is devised so as to obtain a good secondary spectrum of the lateral chromatic aberration over the entire zoom range. As a result, in a case where an optical material used in the first lens unit does not include an appropriate material also, there arises a problem in that the longitudinal chromatic aberration is overcorrected especially at the telephoto end. The first lens unit has a positive refractive power, and in order to satisfactorily correct the secondary spectrum of the longitudinal chromatic aberration at the telephoto end, there is a need to determine the material so as to obtain an appropriate amount of correction of the amount of secondary spectrum $\Delta S$ generated in the first lens unit. The conditional expression (8) is defined so as to achieve the correction of the longitudinal chromatic aberration at the telephoto end and high optical performance. When the condition of an upper limit of the conditional expression (8) is not satisfied, the secondary spectrum of the longitudinal chromatic aberration at the telephoto end is advantageously corrected, but refractive indices of convex lenses forming the second lens unit are reduced, with the result that radii of curvature of the convex lenses forming the second lens unit become small. As a result, a high order aberration of the spherical aberration at the telephoto end is increased, which makes it difficult to achieve the good optical performance. When the condition of a lower limit of the conditional expression (8) is not satisfied, the secondary spectrum of the longitudinal chromatic aberration at the telephoto end is increased, which makes it difficult to satisfactorily correct chromatic aberrations at the telephoto end. It is more preferred to set the numerical value range of the conditional expression (8) as follows:

$$-1.60\times10^{-3}<(\theta 1p-1n)/(\nu 1p-\nu 1n)<-1.00\times10^{-3} \quad (8a)$$

A specific configuration of the zoom lens of the present invention is described below by way of features of lens configurations of Embodiments 1 to 6 and Numerical Embodiments 1 to 6 corresponding thereto, respectively.

[Embodiment 1]

Figure 2A:
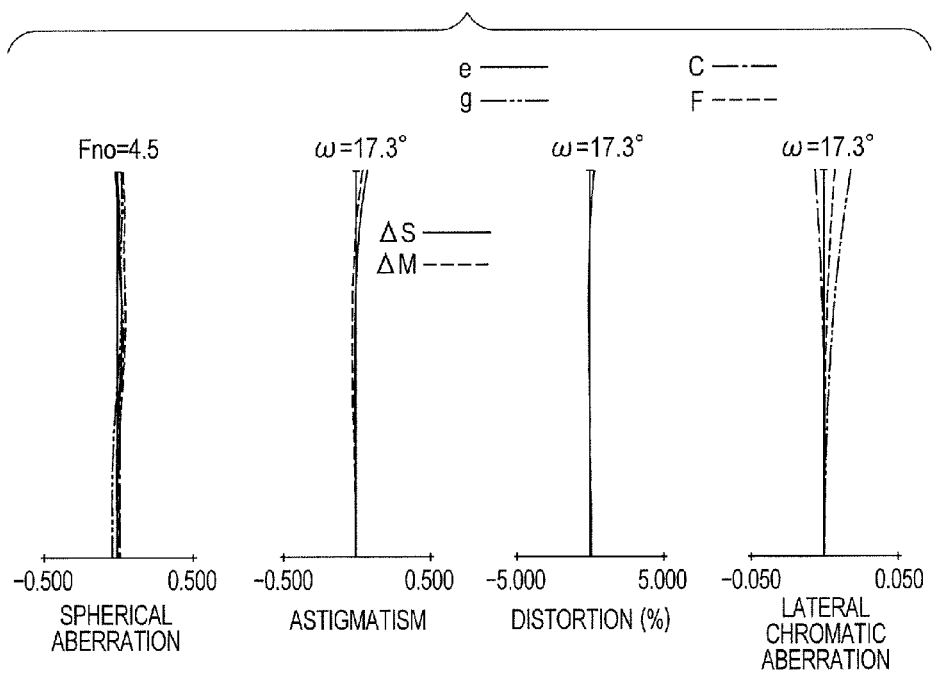
FIG. 2A is a longitudinal aberration diagram when focus is at infinity at the wide angle end in the zoom lens according to Embodiment 1.
Figure 2B:
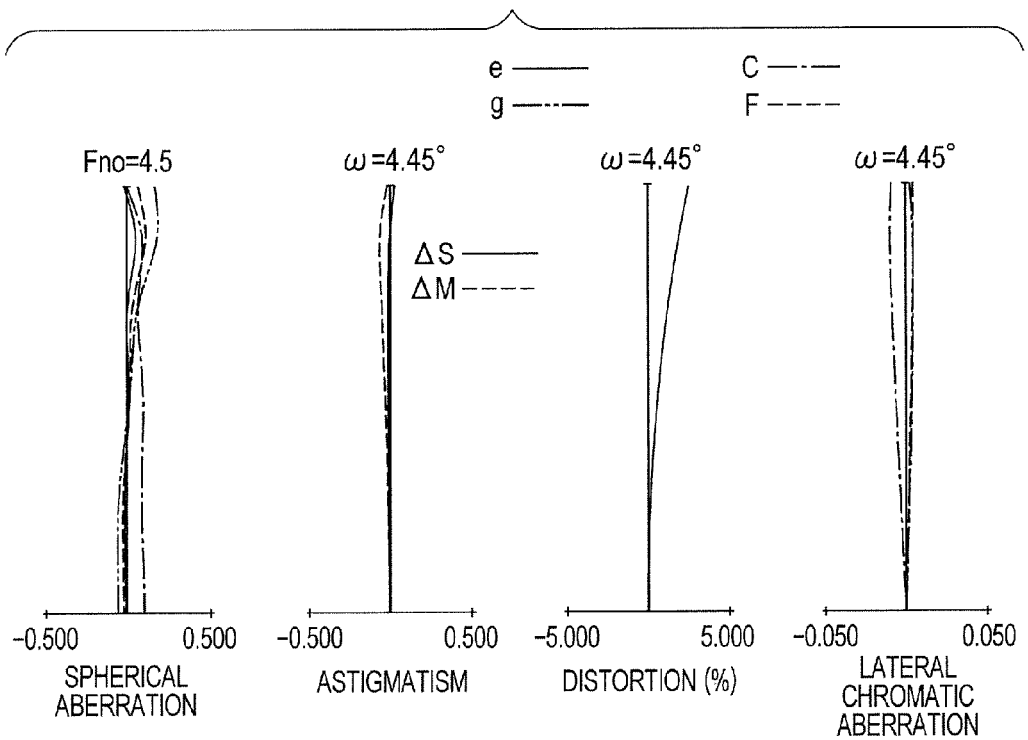
FIG. 2B is a longitudinal aberration diagram when focus is at infinity at a focal length of 200 mm in the zoom lens according to Embodiment 1.
Figure 2C:
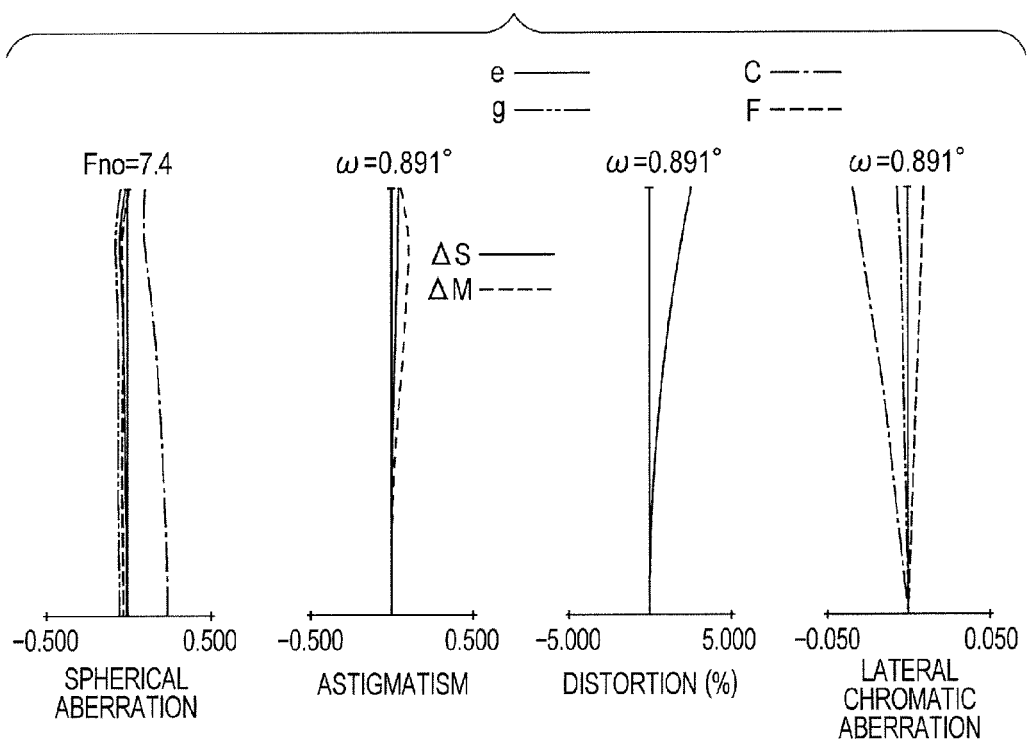
FIG. 2C is a longitudinal aberration diagram when focus is at infinity at a telephoto end in the zoom lens according to Embodiment 1.
Figure 3:
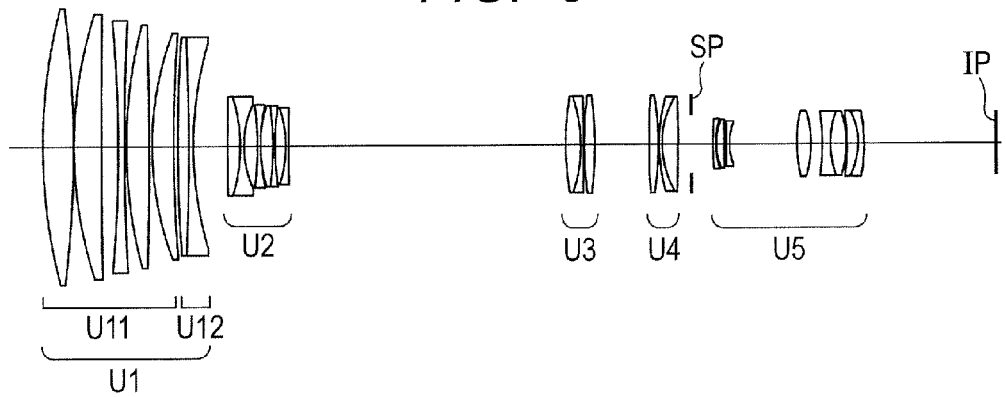
FIG. 3 is a lens cross-sectional view when focus is at infinity at the wide angle end in a zoom lens according to Embodiment 2.
Figure 4A:
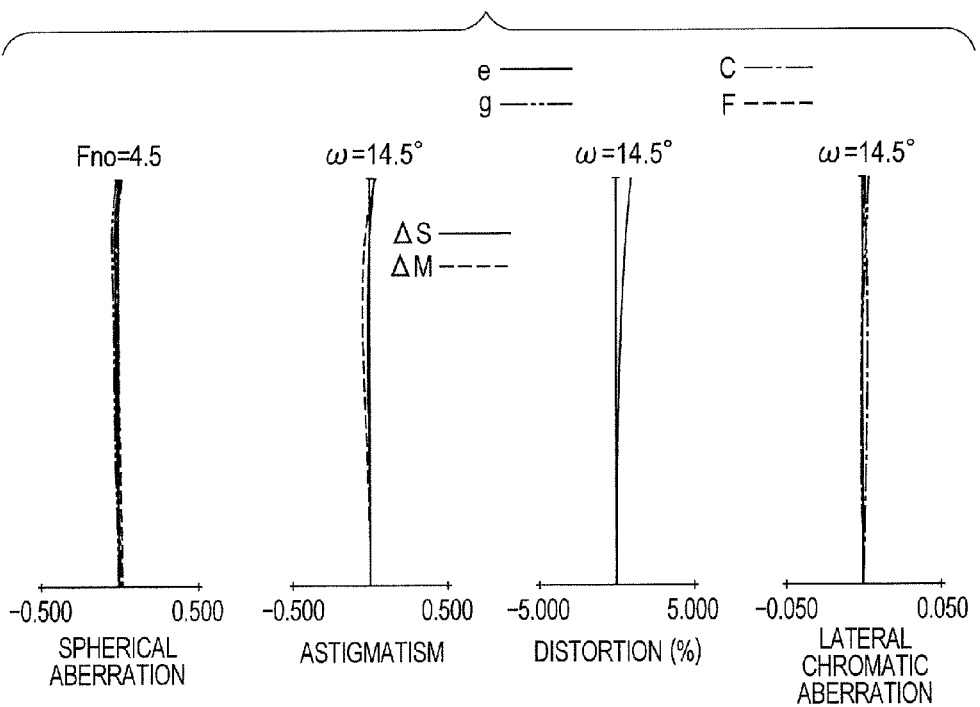
FIG. 4A is a longitudinal aberration diagram when focus is at infinity at the wide angle end in the zoom lens according to Embodiment 2.
Figure 5:
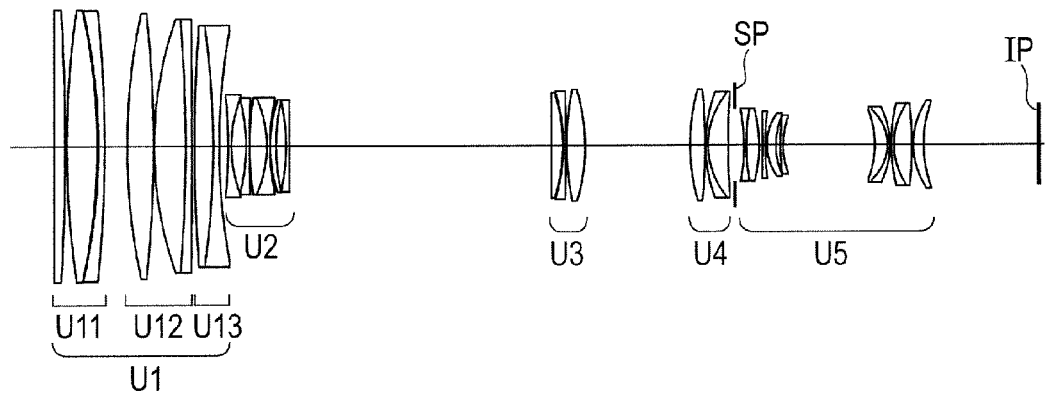
FIG. 5 is a lens cross-sectional view when focus is at infinity at the wide angle end in a zoom lens according to Embodiment 3.
Figure 6A:
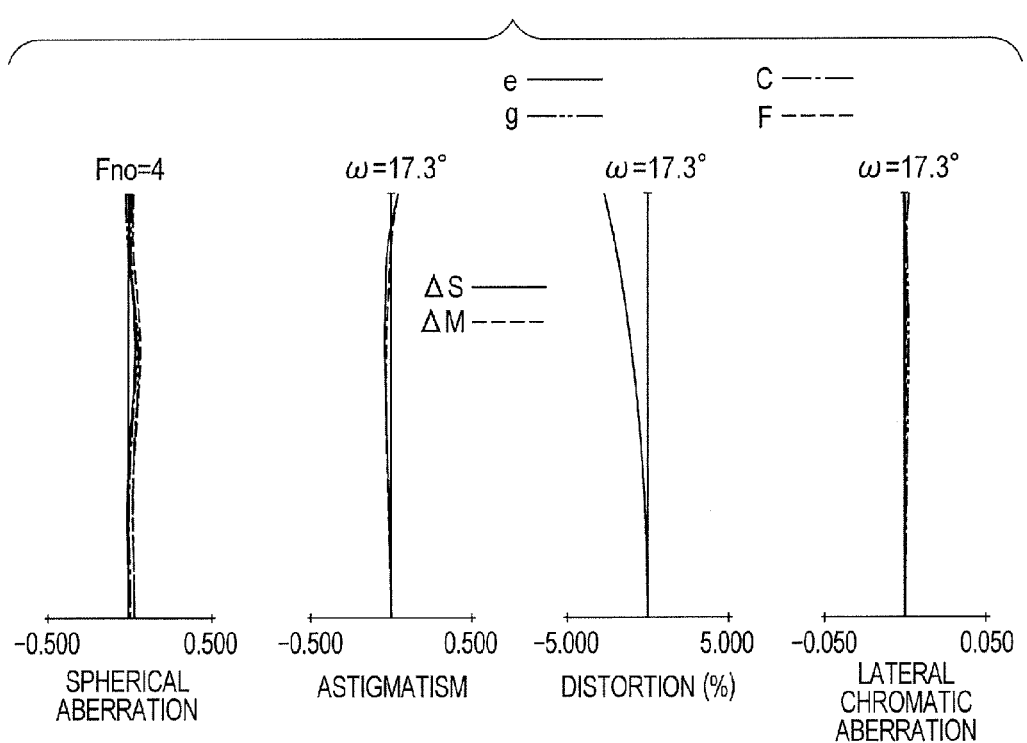
FIG. 6A is a longitudinal aberration diagram when focus is at infinity at the wide angle end in the zoom lens according to Embodiment 3.
Figure 6B:
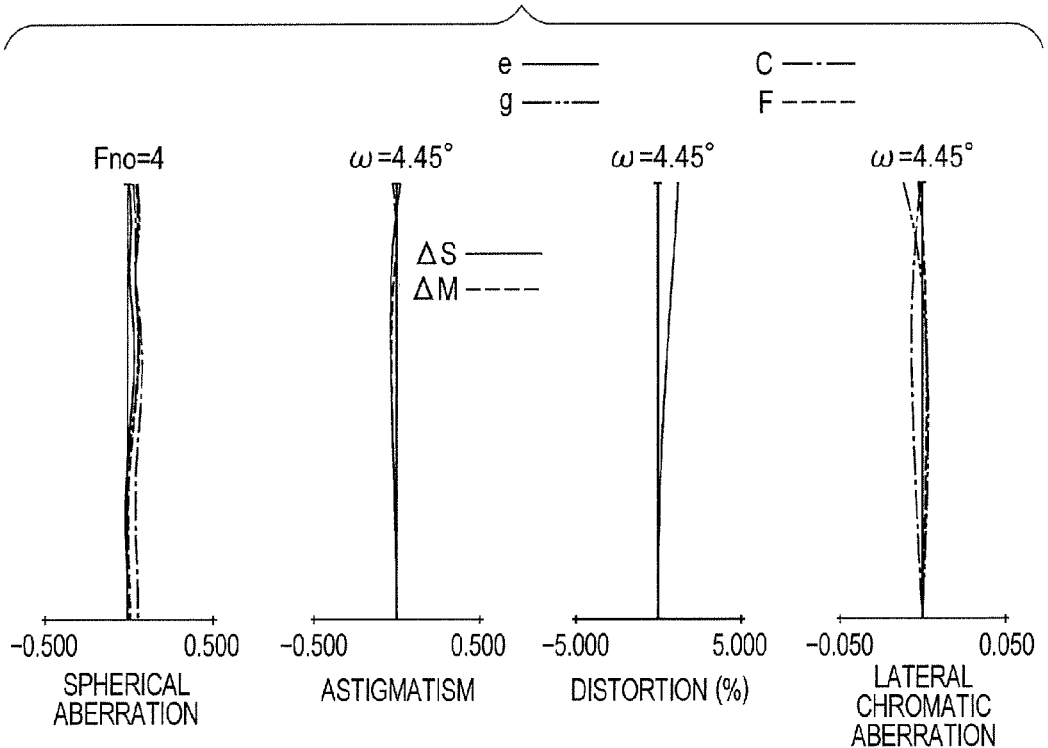
FIG. 6B is a longitudinal aberration diagram when focus is at infinity at the focal length of 200 mm in the zoom lens according to Embodiment 3.
Figure 6C:
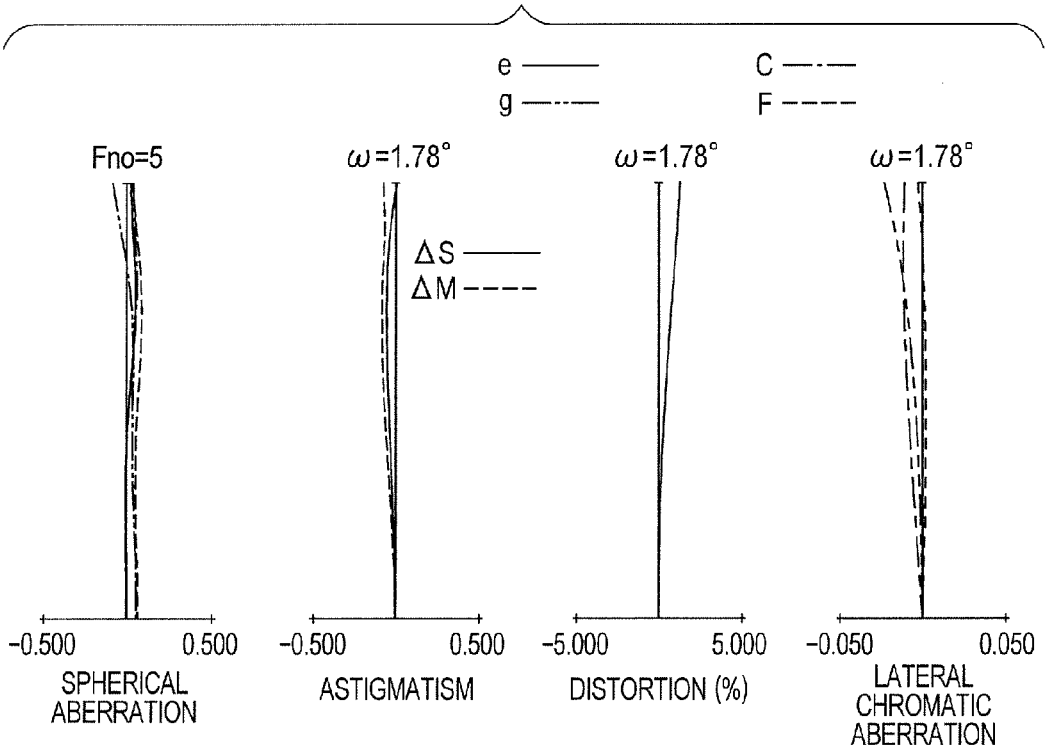
FIG. 6C is a longitudinal aberration diagram when focus is at infinity at the telephoto end in the zoom lens according to Embodiment 3.
Figure 7:
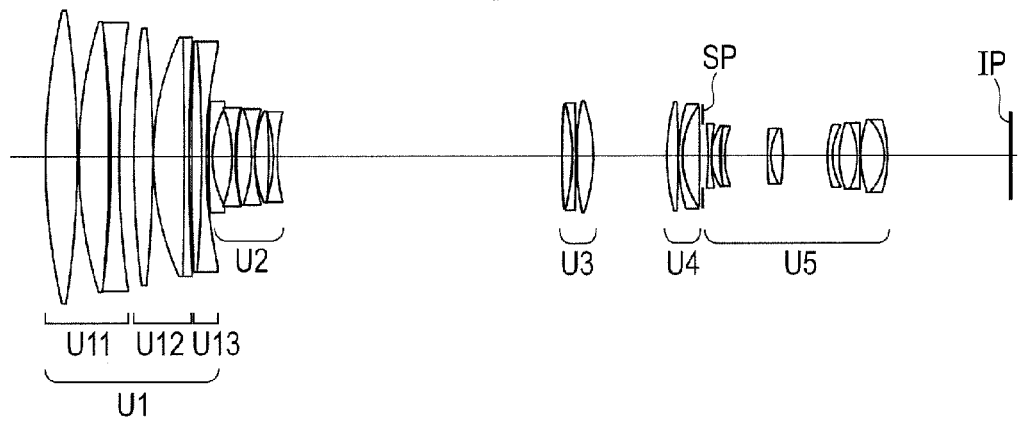
FIG. 7 is a lens cross-sectional view when focus is at infinity at the wide angle end in a zoom lens according to Embodiment 4.
Figure 8A:
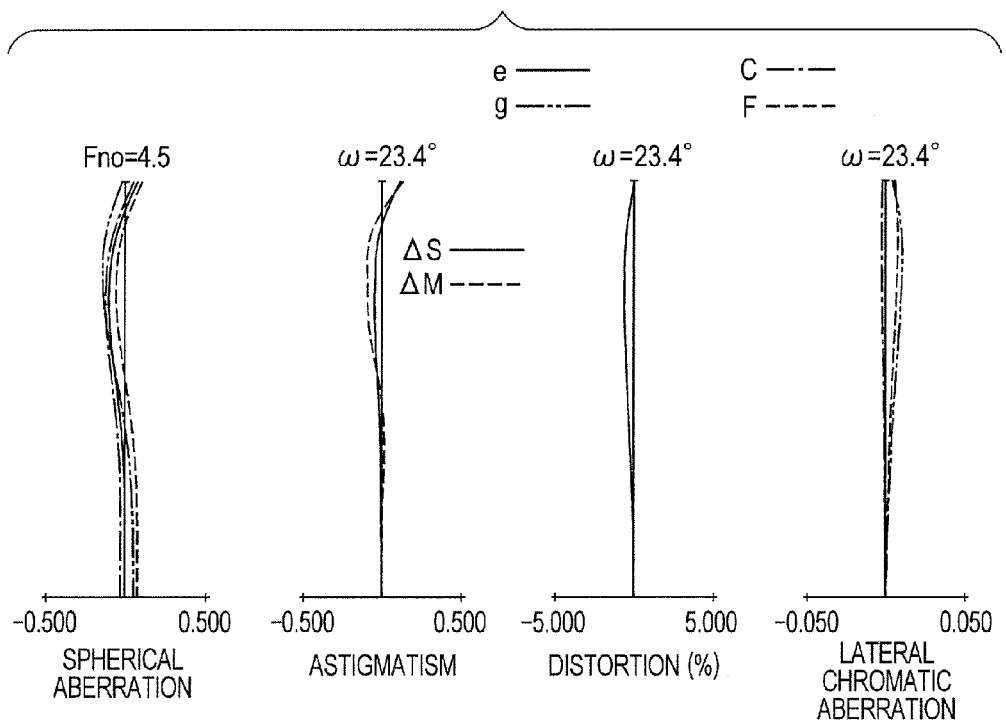
FIG. 8A is a longitudinal aberration diagram when focus is at infinity at the wide angle end in the zoom lens according to Embodiment 4.
Figure 8B:
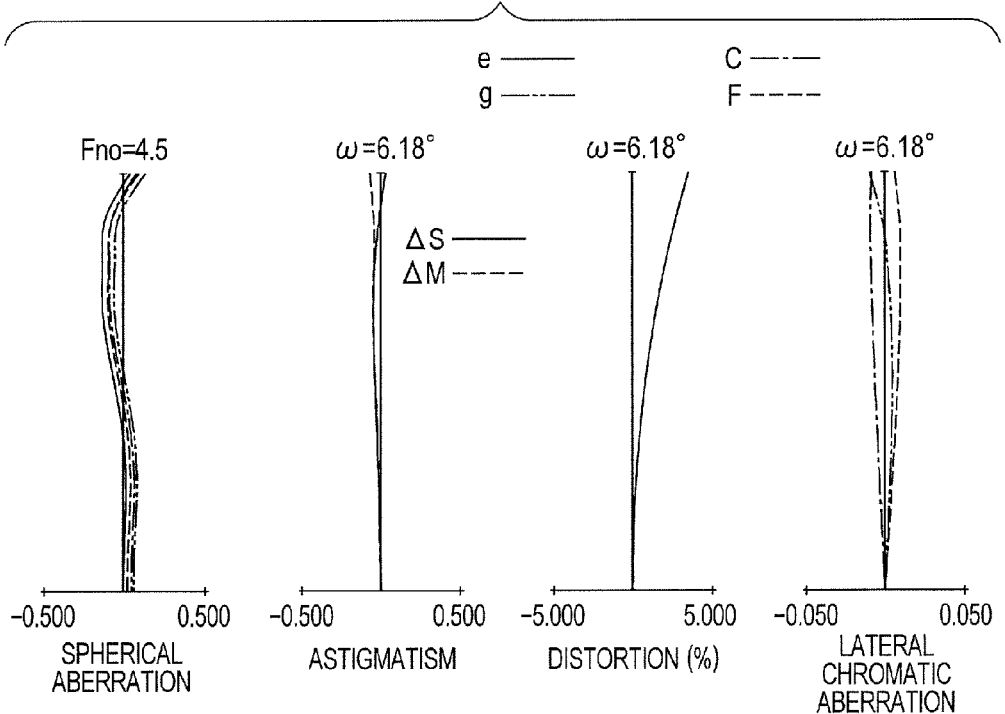
FIG. 8B is a longitudinal aberration diagram when focus is at infinity at the focal length of 200 mm in the zoom lens according to Embodiment 4.
Figure 8C:
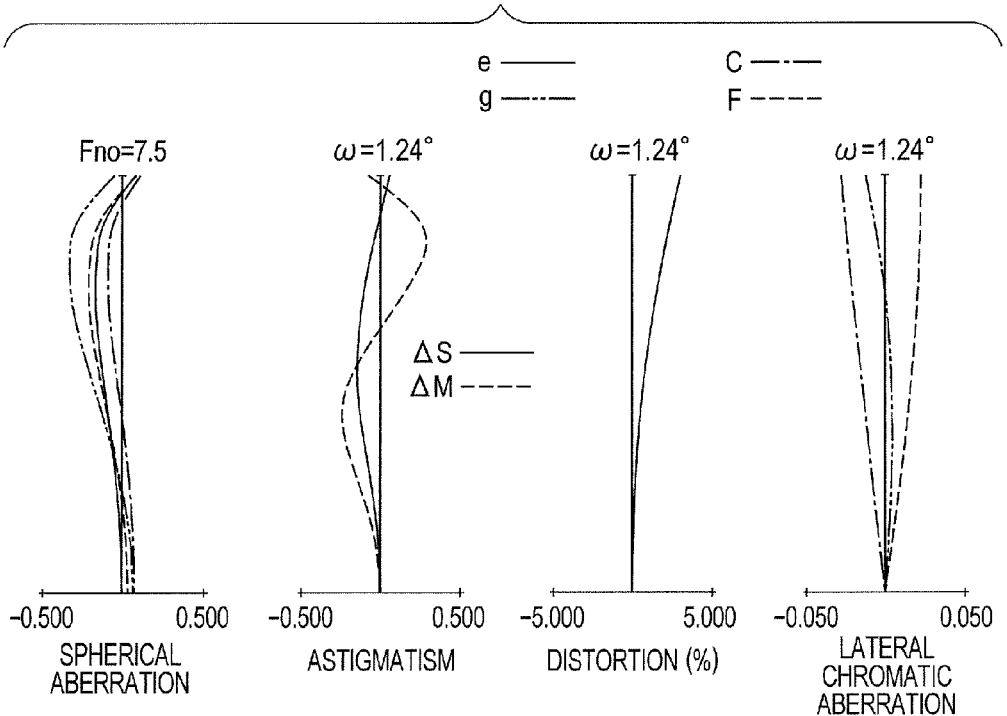
FIG. 8C is a longitudinal aberration diagram when focus is at infinity at the telephoto end in the zoom lens according to Embodiment 4.
Figure 10B:
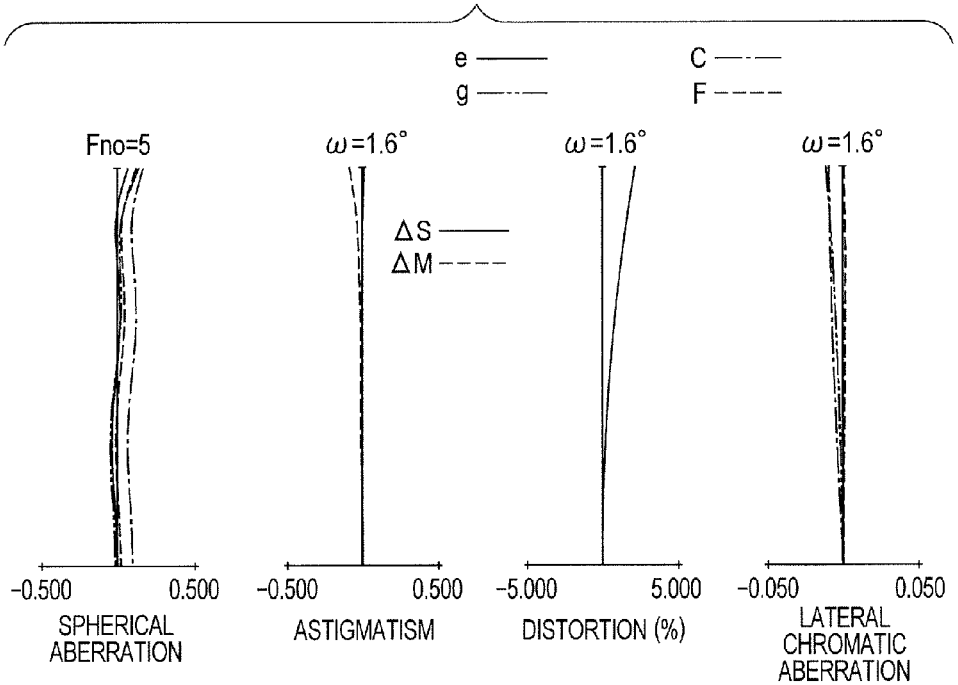
FIG. 10B is a longitudinal aberration diagram when focus is at infinity at a focal length of 500 mm in the zoom lens according to Embodiment 5.
Figure 10C:
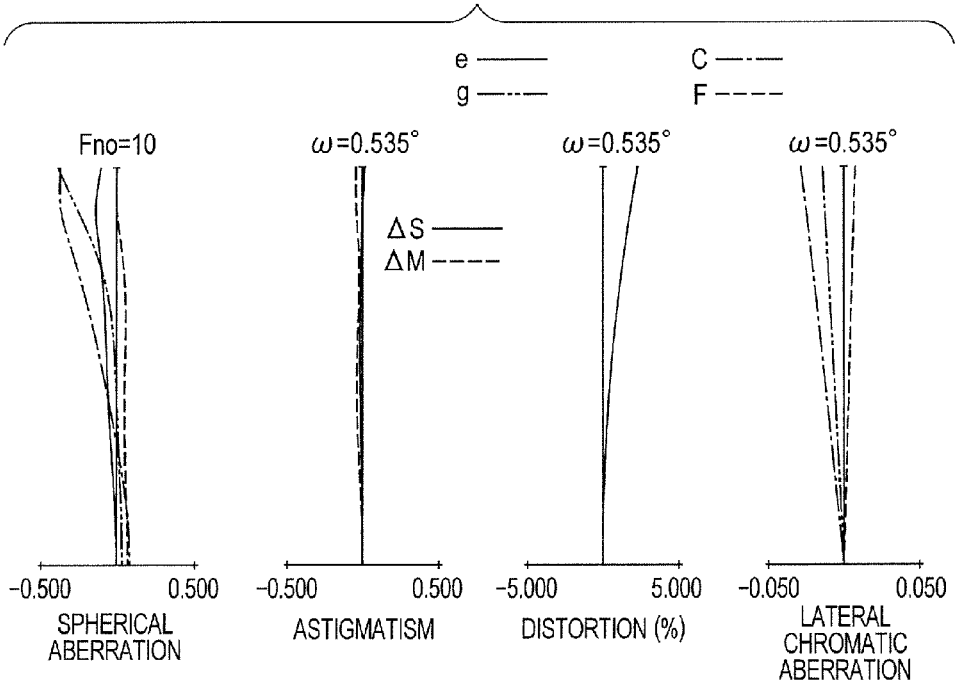
FIG. 10C is a longitudinal aberration diagram when focus is at infinity at the telephoto end in the zoom lens according to Embodiment 5.
Figure 11:
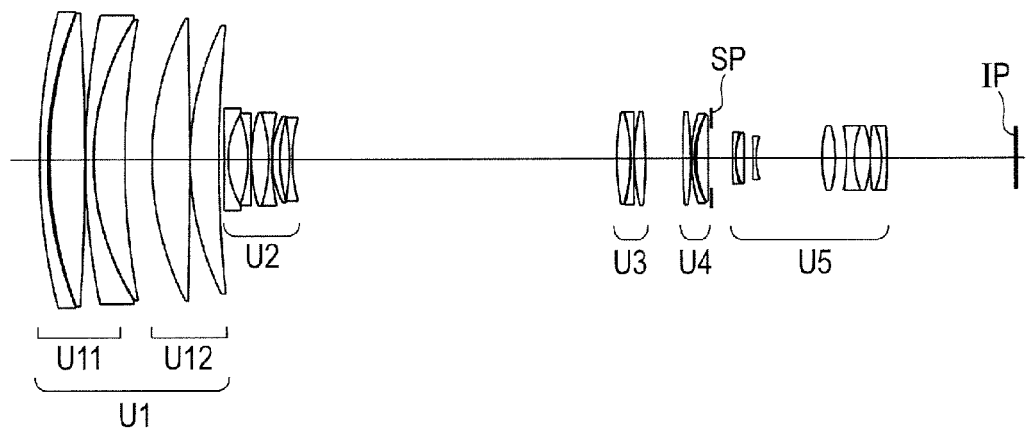
FIG. 11 is a lens cross-sectional view when focus is at infinity at the wide angle end in a zoom lens according to Embodiment 6.
Figure 12A:
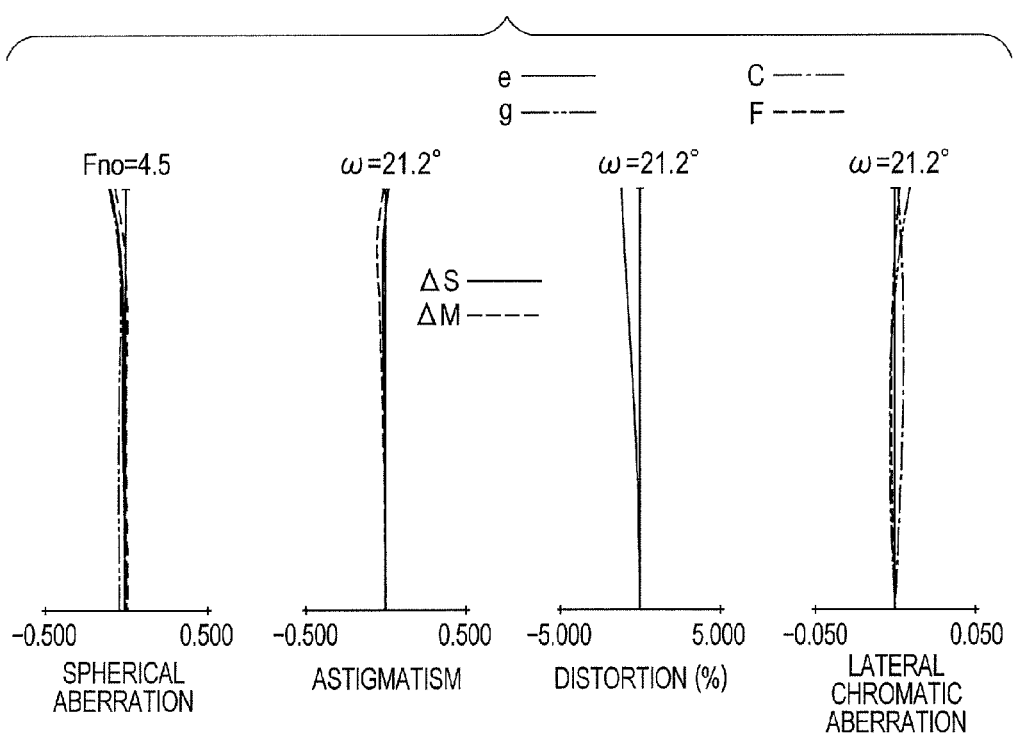
FIG. 12A is a longitudinal aberration diagram when focus is at infinity at the wide angle end in the zoom lens according to Embodiment 6.
Figure 12B:
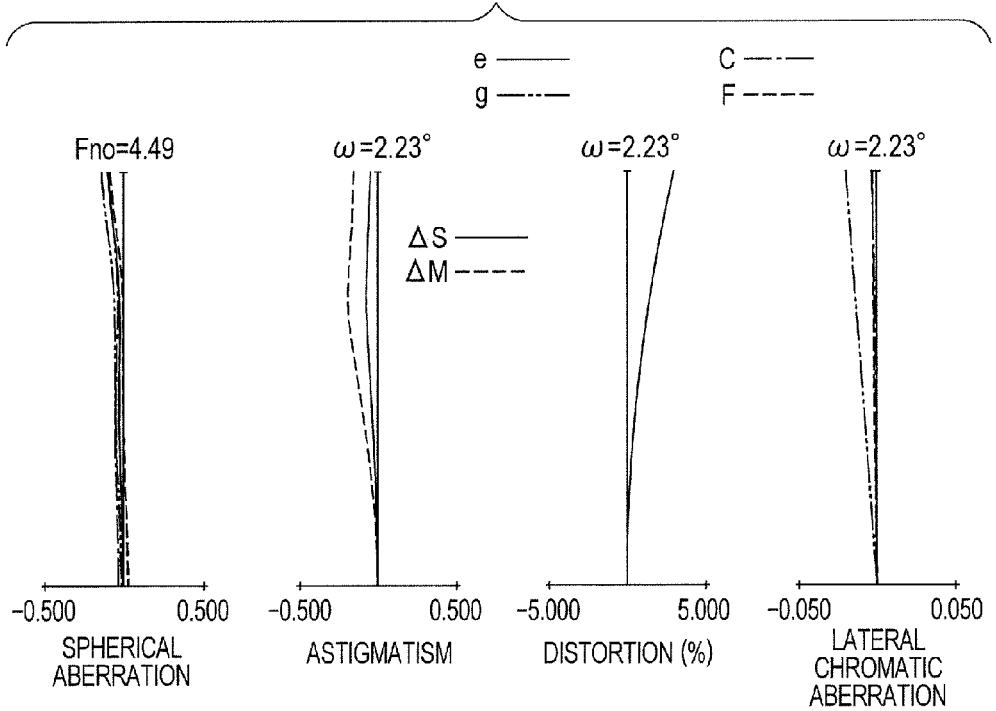
FIG. 12B is a longitudinal aberration diagram when focus is at infinity at a focal length of 400 mm in the zoom lens according to Embodiment 6.
Figure 12C:
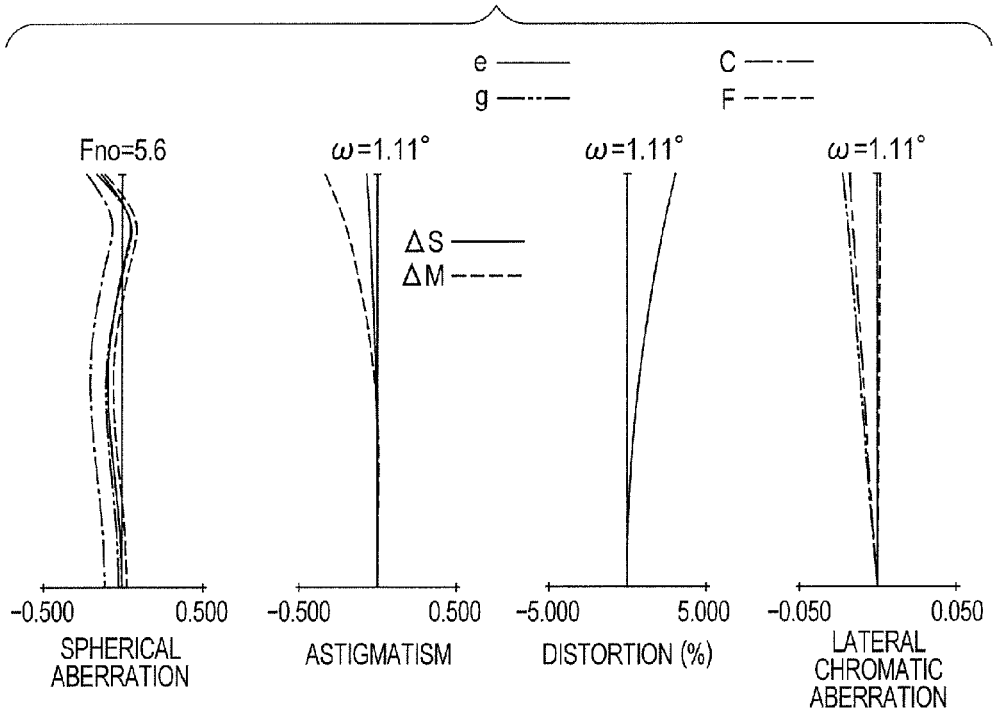
FIG. 12C is a longitudinal aberration diagram when focus is at infinity at the telephoto end in the zoom lens according to Embodiment 6.

FIG. 1 is a lens cross-sectional view when focus is at an object at infinity at the wide angle end (short focal length end) in Numerical Embodiment 1 as Embodiment 1 of the present invention. FIGS. 2A, 2B, and 2C are aberration diagrams when focus is at infinity at the wide angle end, when focus is at infinity at a zoom position having a focal length of 200 mm, and when focus is at infinity at the telephoto end, respectively. In the lens cross-sectional views, the left side is a subject (object) side (front side), and the right side is the image side (rear side). A first lens unit U1 having a positive refractive power that does not move includes, in order from the object side to the image side, a first sub lens unit U11 having a positive refractive power, a second sub lens unit U12 having a positive refractive power, and a third sub lens unit U13 having a negative refractive power. A second lens unit U2 having the negative refractive power that moves during zooming is moved on the optical axis toward the image plane side to perform zooming from the wide angle end to the telephoto end. A third lens unit U3 having a positive refractive power and a fourth lens unit U4 having a positive refractive power both move on the optical axis during zooming from the wide angle end to the telephoto end. An aperture stop SP does not move in an optical axis direction, and a fifth lens unit (relay lens unit) U5 having a positive refractive power that does not move has an imaging function. In the fifth lens unit U5, a converter (extender) for converting the focal length or the like may be mounted. An image plane IP corresponds to the imaging surface such as a solid-state image pickup element or a film surface. The focusing may be performed by moving a part of the first lens unit, such as the sub lens unit U12, in the optical axis direction, or by moving the second lens unit and the subsequent movable lens units or a part of fixed lens units.

In the aberration diagrams, the straight line, the broken line, the one-dot chain line, and the two-dot chain line in the spherical aberration represent an e-Line, the F-Line, the C-Line, and the g-Line, respectively. The solid line and the one-dot chain line in astigmatism represent a sagittal image plane (ΔS) and a meridional image plane (ΔM), respectively, and the broken line, the one-dot chain line, and the two-dot chain line in the lateral chromatic aberration represent the F-Line, the C-Line, and the g-Line, respectively. The astigmatism and the lateral chromatic aberration are illustrated as amounts of aberrations when a ray that passes through a center of a light flux at a stop position is assumed to be a principal ray. A paraxial half angle of field is represented by w, and an F-number is denoted by Fno. In longitudinal aberration diagrams, the spherical aberration, the astigmatism, a distortion, and the lateral chromatic aberration are drawn at scales of 0.5 mm, 0.5 mm, 5%, and 0.05 mm, respectively. Note that, in the following embodiments, the terms "wide angle end" and "telephoto end" refer to zoom positions at times when the second lens unit is located at both ends of a range in which the second lens unit is mechanically movable on the optical axis, respectively. The above descriptions on the lens cross-sectional views and the aberration diagrams are the same also in the following embodiments unless otherwise specified.

The first to fourth lens units in Numerical Embodiment 1 as Embodiment 1 are described. In Numerical Embodiment 1, the first lens unit U1 corresponds to the first to fourteenth lens surfaces, and includes, in order from the object side to the image side, the first sub lens unit having a positive refractive power, the second sub lens unit having a positive refractive power, and a third sub lens unit having a negative refractive power. The first sub lens unit having the positive refractive power includes, in order from the object side to the image side, two positive lenses and a negative lens. The second sub lens unit having the positive refractive power includes, in order from the object side to the image side, a positive lens, and a cemented positive lens formed by cementing a positive lens and a negative lens, and the second sub lens unit is moved in the optical axis direction to perform focus adjustment. The third sub lens unit includes a cemented negative lens formed by cementing a positive lens and a negative lens. The second lens unit U2 corresponds to the fifteenth to twenty-fifth lens surfaces in Numerical Embodiment 1, and includes, in order from the object side to the image side, a negative lens, a cemented negative lens formed by cementing a positive lens and a negative lens, a negative lens, a positive lens, and a negative lens. The third lens unit U3 corresponds to the twenty-sixth to thirty-first lens surfaces in Numerical Embodiment 1, and includes, in order from the object side to the image side, a positive lens, a negative lens, and a positive lens. The fourth lens unit U4 corresponds to the thirty-second to thirty-seventh lens surfaces in Numerical Embodiment 1, and includes, in order from the object side to the image side, a positive lens, a negative lens, and a positive lens. An aspherical surface is used for the twenty-ninth surface to correct variations in coma and spherical aberration due to zooming. Note that, in this embodiment, the front lens unit corresponds to the first and second sub lens units and f1f corresponds to a combined focal length of the first and second sub lens units in the state in which focus is at infinity, and the rear lens unit corresponds to the third sub lens unit and f1r corresponds to a focal length of the third sub lens unit.

Table 1 shows values corresponding to the conditional expressions in Embodiment 1. In this numerical embodiment, all of the conditional expressions are satisfied to achieve the good optical performance. In addition, the zoom lens, which is usable in the super telephoto range and has the high magnification and a large aperture, has a focal length at the wide angle end of 50 mm, a magnification of 20×, a large maximum image height of 15.55 mm, an F-number at the wide angle end of 4.5, and an F-number at the telephoto end of 7.4, and achieves the reduction in size at the same time.

[Embodiment 2]

First to fourth lens units in Numerical Embodiment 2 as Embodiment 2 are described. In Numerical Embodiment 2, the first lens unit U1 corresponds to the first to thirteenth lens surfaces, and includes, in order from the object side to the image side, the first sub lens unit having a positive refractive power and the second sub lens unit having a negative refractive power. The first sub lens unit having the positive refractive power includes, in order from the object side to the image side, two positive lenses, a negative lens, and two positive lenses. The second sub lens unit includes a cemented negative lens formed by cementing a positive lens and a negative lens, and the second sub lens unit is moved in the optical axis direction to perform focus adjustment. The second lens unit U2 corresponds to the fourteenth to twenty-third lens surfaces in Numerical Embodiment 2, and includes, in order from the object side to the image side, a cemented negative lens formed by cementing a positive lens and a negative lens, a negative lens, a cemented positive lens formed by cementing a positive lens and a negative lens, and a negative lens. The third lens unit U3 corresponds to the twenty-fourth to twenty-eighth lens surfaces in Numerical Embodiment 2, and includes, in order from the object side to the image side, a cemented positive lens formed by cementing a positive lens and a negative lens, and a positive lens. The fourth lens unit U4 corresponds to the twenty-ninth to thirty-third lens surfaces in Numerical Embodiment 2, and includes, in order from the object side to the image side, a positive lens, and a cemented lens formed by cementing a negative lens and a positive lens. Aspherical surfaces are used for the twenty-seventh surface and the twenty-eighth surface to correct the variations in coma and spherical aberration due to the zooming. Note that, in this embodiment, the front lens unit corresponds to the first and second sub lens units and $f1f$ corresponds to a combined focal length of the first and second sub lens units in the state in which focus is at infinity, and the rear lens unit corresponds to the third sub lens unit and $f1r$ corresponds to a focal length of the third sub lens unit.

Table 1 shows values corresponding to the conditional expressions in Embodiment 2. In this numerical embodiment, all of the conditional expressions are satisfied to achieve the good optical performance. In addition, the zoom lens, which is usable in the super telephoto range and has the high magnification and a large aperture, has a focal length at the wide angle end of 60 mm, a magnification of 15×, a large maximum image height of 15.55 mm, an F-number at the wide angle end of 4.5, and an F-number at the telephoto end of 7.0, and achieves the reduction in size at the same time.

[Embodiment 3]

First to fourth lens units in Numerical Embodiment 3 as Embodiment 3 are described. In Numerical Embodiment 3, the first lens unit U1 corresponds to the first to fourteenth lens surfaces, and includes, in order from the object side to the image side, the first sub lens unit having a positive refractive power, the second sub lens unit having a positive refractive power, and a third sub lens unit having a negative refractive power. The first sub lens unit having the positive refractive power includes, in order from the object side to the image side, two positive lenses and a negative lens. The second sub lens unit having the positive refractive power includes, in order from the object side to the image side, a positive lens, and a cemented positive lens formed by cementing a positive lens and a negative lens, and the second sub lens unit is moved in the optical axis direction to perform focus adjustment. The third sub lens unit includes a cemented negative lens formed by cementing a positive lens and a negative lens. The second lens unit U2 corresponds to the fifteenth to twenty-fifth lens surfaces in Numerical Embodiment 3, and includes, in order from the object side to the image side, two negative lenses, a cemented negative lens formed by cementing a positive lens and a negative lens, a positive lens, and a negative lens. The third lens unit U3 corresponds to the twenty-sixth to thirty-first lens surfaces in Numerical Embodiment 3, and includes, in order from the object side to the image side, a positive lens, a negative lens, and a positive lens. The fourth lens unit U4 corresponds to the thirty-second to thirty-sixth lens surfaces in Numerical Embodiment 3, and includes, in order from the object side to the image side, a positive lens and a cemented lens formed by cementing a negative lens and a positive lens. An aspherical surface is used for the twenty-ninth surface to correct variations in coma and spherical aberration due to zooming. Note that, in this embodiment, the front lens unit corresponds to the first and second sub lens units and $f1f$ corresponds to a combined focal length of the first and second sub lens units in the state in which focus is at infinity, and the rear lens unit corresponds to the third sub lens unit and $f1r$ corresponds to a focal length of the third sub lens unit.

Table 1 shows values corresponding to the conditional expressions in Embodiment 3. In this numerical embodiment, all of the conditional expressions are satisfied to achieve the good optical performance. In addition, the zoom lens, which is usable in the super telephoto range and has the high magnification and a large aperture, has a focal length at the wide angle end of 50 mm, a magnification of 10×, a large maximum image height of 15.55 mm, an F-number at the wide angle end of 4.0, and an F-number at the telephoto end of 5.0, and achieves the reduction in size at the same time.

[Embodiment 4]

First to fourth lens units in Numerical Embodiment 4 as Embodiment 4 are described. In Numerical Embodiment 4, the first lens unit U1 corresponds to the first to fourteenth lens surfaces, and includes, in order from the object side to the image side, the first sub lens unit having a positive refractive power, the second sub lens unit having a positive refractive power, and a third sub lens unit having a negative refractive power. The first sub lens unit having the positive refractive power includes, in order from the object side to the image side, two positive lenses and a negative lens. The second sub lens unit having the positive refractive power includes, in order from the object side to the image side, a positive lens, and a cemented positive lens formed by cementing a positive lens and a negative lens, and the second sub lens unit is moved in the optical axis direction to perform focus adjustment. The third sub lens unit includes a cemented negative lens formed by cementing a positive lens and a negative lens. The second lens unit U2 corresponds to the fifteenth to twenty-fifth lens surfaces in Numerical Embodiment 4, and includes, in order from the object side to the image side, two negative lenses, a cemented negative lens formed by cementing a positive lens and a negative lens, a positive lens, and a negative lens. The third lens unit U3 corresponds to the twenty-sixth to thirty-first lens surfaces in Numerical Embodiment 4, and includes, in order from the object side to the image side, a positive lens, a negative lens, and a positive lens. The fourth lens unit U4 corresponds to the thirty-second to thirty-seventh lens surfaces in Numerical Embodiment 4, and includes, in order from the object side to the image side, a positive lens, a negative lens, and a positive lens. Aspherical surfaces are used for the fifteenth, twenty-second, twenty-ninth, and forty-ninth surfaces to suppress a variation in off-axial aberration by the fifteenth and twenty-second surfaces, the variations in spherical aberration and coma by the twenty-ninth surface, and a high-order image plane aberration in a high image height by the forty-ninth surface. Note that, in this embodiment, the front lens unit corresponds to the first and second sub lens units and $f1f$ corresponds to a combined focal length of the first and second sub lens units in the state in which focus is at infinity and the rear lens unit corresponds to the third sub lens units and $f1r$ corresponds to a focal length of the third sub lens unit.

Table 1 shows values corresponding to the conditional expressions in Embodiment 4. In this numerical embodiment, all of the conditional expressions are satisfied to achieve the good optical performance. In addition, the zoom lens, which is usable in the super telephoto range and has the high magnification and a large aperture, has a focal length at the wide angle end of 50 mm, a magnification of 20x, a large maximum image height of 21.64 mm, an F-number at the wide angle end of 4.5, and an F-number at the telephoto end of 7.5, and achieves the reduction in size at the same time.

[Embodiment 5]

First to fourth lens units in Numerical Embodiment 5 as Embodiment 5 are described. In Numerical Embodiment 5, the first lens unit U1 corresponds to the first to fourteenth lens surfaces, and includes, in order from the object side to the image side, the first sub lens unit having a positive refractive power, the second sub lens unit having a positive refractive power, and a third sub lens unit having a negative refractive power. The first sub lens unit having the positive refractive power includes, in order from the object side to the image side, two positive lenses and a negative lens. The second sub lens unit having the positive refractive power includes, in order from the object side to the image side, a positive lens, and a cemented positive lens formed by cementing a positive lens and a negative lens, and the second sub lens unit is moved in the optical axis direction to perform focus adjustment. The third sub lens unit includes a cemented negative lens formed by cementing a positive lens and a negative lens. The second lens unit U2 corresponds to the fifteenth to twenty-fourth lens surfaces in Numerical Embodiment 5, and includes, in order from the object side to the image side, a negative lens, a cemented negative lens formed by cementing a negative lens and a positive lens, a cemented negative lens formed by cementing a negative lens and a positive lens, and a negative lens. The third lens unit U3 corresponds to the twenty-fifth to thirtieth lens surfaces in Numerical Embodiment 5, and includes, in order from the object side to the image side, a positive lens, a negative lens, and a positive lens. The fourth lens unit U4 corresponds to the thirty-first to thirty-fifth lens surfaces in Numerical Embodiment 5, and includes, in order from the object side to the image side, a positive lens, a negative lens, and a positive lens. Aspherical surfaces are used for the fifteenth, twenty-eighth, thirty-first, and forty-second surfaces to suppress a variation in off-axial aberration by the fifteenth surface, the variations in spherical aberration and coma by the twenty-eighth and thirty-first surfaces, and a high-order image plane aberration in a high image height by the forty-second surface. Note that, in this embodiment, the front lens unit corresponds to the first and second sub lens units and f1$f$ corresponds to a combined focal length of the first and second sub lens units in the state in which focus is at infinity, and the rear lens unit corresponds to the third sub lens unit and f1$r$ corresponds to a focal length of the third sub lens unit.

Table 1 shows values corresponding to the conditional expressions in Embodiment 5. In this numerical embodiment, all of the conditional expressions are satisfied to achieve the good optical performance. In addition, the zoom lens, which is usable in the super telephoto range and has the high magnification and a large aperture, has a focal length at the wide angle end of 50 mm, a magnification of 30x, a large maximum image height of 14.0 mm, an F-number at the wide angle end of 4.5, and an F-number at the telephoto end of 10.0, and achieves the reduction in size at the same time.

[Embodiment 6]

First to fourth lens units in Numerical Embodiment 6 as Embodiment 6 are described. The first lens unit U1 corresponds to the first to twelfth lens surfaces in Numerical Embodiment 6, and includes, in order from the object side to the image side, a first sub lens unit having a very weak negative refractive power, and a second sub lens unit having a positive refractive power. The first sub lens unit having the negative refractive power includes, in order from the object side to the image side, a negative lens, a positive lens, a negative lens, and a positive lens. The second sub lens unit having the positive refractive power includes, in order from the object side to the image side, two positive lenses, and moves the second sub lens unit in the optical axis direction to perform the focus adjustment. The second lens unit U2 corresponds to the thirteenth to twenty-third lens surfaces in Numerical Embodiment 6, and includes, in order from the object side to the image side, two negative lenses, a cemented positive lens formed by cementing a positive lens and a negative lens, a negative lens, and a positive lens. The third lens unit U3 corresponds to the twenty-fourth to twenty-ninth lens surfaces in Numerical Embodiment 6, and includes, in order from the object side to the image side, a positive lens, a negative lens, and a positive lens. The fourth lens unit U4 corresponds to the thirtieth to thirty-fifth lens surfaces in Numerical Embodiment 6, and includes, in order from the object side to the image side, a positive lens, a negative lens, and a positive lens. An aspherical surface is used for the twenty-seventh surface to suppress variations in spherical aberration and coma. Note that, in this embodiment, the front lens unit corresponds to the first sub lens unit and f1$f$ corresponds to a focal length of the first sub lens unit, and the rear lens unit corresponds to the second sub lens unit and f1$r$ corresponds to a focal length of the second sub lens unit.

Table 1 shows values corresponding to the conditional expressions in Embodiment 6. In this numerical embodiment, the conditional expressions (1) to (3) and (5) to (8) are satisfied to achieve the good optical performance. In addition, the zoom lens, which is usable in the super telephoto range and has the high magnification and a large aperture, has a focal length at the wide angle end of 40 mm, a magnification of 20x, a large maximum image height of 15.55 mm, an F-number at the wide angle end of 4.5, and an F-number at the telephoto end of 5.6, and achieves the reduction in size at the same time.

(Numerical Embodiments)

Next, Numerical Embodiments 1 to 6 corresponding to Embodiments 1 to 6 of the present invention are shown below. In each of the numerical embodiments, symbol "i" represents the order of a surface from the object side, symbol "ri" represents a radius of curvature of an i-th surface from the object side, symbol "di" represents an interval between the i-th surface and an (i+1)th surface from the object side, and symbols "ndi" and "vdi" respectively represent a refractive index and an Abbe number of an optical material between the i-th surface and the (i+1)th surface. The focal length, the F-number, and the angle of field represent values when focus is at infinity. Symbol BF is an air conversion value of a distance from the final surface of the lens to the image plane.

Note that, the aspherical shape is expressed by the following expression:

$$x=(y^2/r)/\{1+(1-ky^2/r^2)^{0.5}\}+A4\times y^4+A6\times y^6+A8\times y^8+A10\times y^{10}+A12\times y^{12}$$

where x represents a coordinate in the optical axis direction, y represents a coordinate in a direction perpendicular to the optical axis, r represents a reference radius of curvature, k represents a conic constant, and An represents an n-th order aspherical coefficient, provided that "e-x" means "$\times 10^{-x}$". Note that, the lens surfaces having the aspherical surfaces are marked with asterisks (*) on the left side of surface numbers in the tables.

Table 1 shows the correspondence between each of the embodiments and each of the above-mentioned conditional expressions.

Numerical Embodiment 1

| Surface number | r | d | nd | vd | θgF | Effective diameter | Focal length |
|---|---|---|---|---|---|---|---|
| 1 | 246.68132 | 17.57134 | 1.433870 | 95.10 | 0.5373 | 137.561 | 379.844 |
| 2 | −489.49126 | 0.70000 | 1.000000 | 0.00 | 0.0000 | 136.362 | 0.000 |
| 3 | 251.80653 | 14.77425 | 1.433870 | 95.10 | 0.5373 | 130.301 | 419.328 |
| 4 | −649.85945 | 1.00394 | 1.000000 | 0.00 | 0.0000 | 128.957 | 0.000 |
| 5 | −509.36354 | 4.00000 | 1.720467 | 34.70 | 0.5834 | 128.865 | −393.778 |
| 6 | 652.48261 | 14.44601 | 1.000000 | 0.00 | 0.0000 | 125.445 | 0.000 |
| 7 | 255.23550 | 10.29049 | 1.433870 | 95.10 | 0.5373 | 118.241 | 558.103 |
| 8 | −4902.84082 | 0.20000 | 1.000000 | 0.00 | 0.0000 | 117.027 | 0.000 |
| 9 | 197.35639 | 12.59513 | 1.438750 | 94.93 | 0.5343 | 111.945 | 420.679 |
| 10 | −2906.58993 | 2.50000 | 1.720467 | 34.70 | 0.5834 | 109.606 | −882.774 |
| 11 | 821.58629 | 2.94687 | 1.000000 | 0.00 | 0.0000 | 107.326 | 0.000 |
| 12 | 1913.20539 | 6.71999 | 1.761821 | 26.52 | 0.6135 | 105.877 | 536.079 |
| 13 | −524.31136 | 2.20000 | 1.618000 | 63.33 | 0.5441 | 104.412 | −267.162 |
| 14 | 242.71285 | (Variable) | 1.000000 | 0.00 | 0.0000 | 99.476 | 0.000 |
| 15 | −860.74296 | 1.80000 | 1.816000 | 46.62 | 0.5568 | 50.656 | −89.348 |
| 16 | 80.17496 | 3.81547 | 1.000000 | 0.00 | 0.0000 | 47.151 | 0.000 |
| 17 | 375.28281 | 7.31173 | 1.720467 | 34.70 | 0.5834 | 46.543 | 69.386 |
| 18 | −57.65105 | 1.50000 | 1.595220 | 67.74 | 0.5442 | 45.806 | −66.490 |
| 19 | 128.90141 | 4.07926 | 1.000000 | 0.00 | 0.0000 | 41.685 | 0.000 |
| 20 | −92.43936 | 1.50000 | 1.595220 | 67.74 | 0.5442 | 41.683 | −65.212 |
| 21 | 67.72717 | 0.10000 | 1.000000 | 0.00 | 0.0000 | 40.314 | 0.000 |
| 22 | 55.67072 | 6.08760 | 1.720467 | 34.70 | 0.5834 | 40.359 | 67.855 |
| 23 | −405.29323 | 2.13101 | 1.000000 | 0.00 | 0.0000 | 39.833 | 0.000 |
| 24 | −77.78064 | 1.40000 | 1.595220 | 67.74 | 0.5442 | 39.815 | −74.269 |
| 25 | 103.94566 | (Variable) | 1.000000 | 0.00 | 0.0000 | 38.960 | 0.000 |
| 26 | 116.76899 | 6.42003 | 1.618000 | 63.33 | 0.5441 | 43.512 | 79.194 |
| 27 | −83.01992 | 0.02878 | 1.000000 | 0.00 | 0.0000 | 43.578 | 0.000 |
| 28 | −86.18403 | 1.50000 | 1.834000 | 37.16 | 0.5775 | 43.539 | −92.667 |
| *29 | 803.67833 | 0.20000 | 1.000000 | 0.00 | 0.0000 | 43.982 | 0.000 |
| 30 | 120.27059 | 5.59541 | 1.496999 | 81.54 | 0.5374 | 44.453 | 130.541 |
| 31 | −139.57348 | (Variable) | 1.000000 | 0.00 | 0.0000 | 44.522 | 0.000 |
| 32 | 87.58614 | 4.42301 | 1.487490 | 70.23 | 0.5300 | 43.877 | 183.090 |
| 33 | 3911.73924 | 0.20000 | 1.000000 | 0.00 | 0.0000 | 43.479 | 0.000 |
| 34 | 86.15302 | 1.50000 | 1.720457 | 34.70 | 0.5834 | 42.506 | −168.527 |
| 35 | 50.16723 | 1.21338 | 1.000000 | 0.00 | 0.0000 | 41.157 | 0.000 |
| 36 | 66.35327 | 5.30796 | 1.496999 | 81.54 | 0.5374 | 41.151 | 116.995 |
| 37 | −468.67849 | (Variable) | 1.000000 | 0.00 | 0.0000 | 40.725 | 0.000 |
| 38 (Stop) | 0.00000 | 10.51965 | 1.000000 | 0.00 | 0.0000 | 28.657 | 0.000 |
| 39 | 603.24912 | 1.40000 | 1.882997 | 40.76 | 0.5667 | 23.839 | −48.954 |
| 40 | 40.51116 | 0.15000 | 1.000000 | 0.00 | 0.0000 | 23.084 | 0.000 |
| 41 | 35.62346 | 4.10373 | 1.805181 | 25.42 | 0.6161 | 23.101 | 36.637 |
| 42 | −171.92350 | 3.92591 | 1.000000 | 0.00 | 0.0000 | 22.594 | 0.000 |
| 43 | −109.90676 | 1.50000 | 1.910820 | 35.25 | 0.5824 | 20.117 | −33.390 |
| 44 | 42.71602 | 33.00000 | 1.000000 | 0.00 | 0.0000 | 19.407 | 0.000 |
| 45 | 90.18955 | 6.39772 | 1.496999 | 81.54 | 0.5374 | 30.314 | 68.285 |
| 46 | −53.37817 | 5.55492 | 1.000000 | 0.00 | 0.0000 | 30.620 | 0.000 |
| 47 | −138.46821 | 4.00000 | 1.882997 | 40.76 | 0.5667 | 29.643 | −36.072 |
| 48 | 42.24648 | 5.86644 | 1.603420 | 38.03 | 0.5835 | 29.852 | 66.251 |
| 49 | −797.00609 | 0.15000 | 1.000000 | 0.00 | 0.0000 | 30.355 | 0.000 |
| 50 | 114.93981 | 7.37952 | 1.517417 | 52.43 | 0.5564 | 30.683 | 53.618 |
| 51 | −35.98055 | 3.00000 | 1.882997 | 40.76 | 0.5667 | 30.879 | −98.457 |
| 52 | −63.53396 | (BF) | 1.000000 | 0.00 | 0.0000 | 31.927 | 0.000 |
| Image plane | ∞ | | | | | | |

Aspherical surface data
Twenty-ninth surface

K = 9.77619e+002   A4 = 1.75645e−007   A6 = −1.54674e−011
A8 = −1.21139e−012   A10 = 2.79900e−015   A12 = −3.45030e−018

Various data
Zoom ratio 20.00

| | Wide angle | Intermediate | Telephoto |
|---|---|---|---|
| Focal length | 50.00 | 200.00 | 1000.00 |
| F number | 4.50 | 4.50 | 7.40 |
| Half angle of field | 17.28 | 4.45 | 0.89 |
| Image height | 15.55 | 15.55 | 15.55 |
| Total lens length | 493.74 | 493.74 | 493.74 |
| BF | 66.76 | 66.76 | 66.76 |
| d14 | 5.00 | 84.76 | 132.18 |
| d25 | 162.25 | 77.28 | 3.00 |
| d31 | 24.90 | 9.14 | 40.88 |
| d37 | 1.82 | 22.78 | 17.91 |

-continued

| Zoom lens unit data | | |
|---|---|---|
| Unit | First surface | Focal length |
| 1 | 1 | 255.00 |
| 2 | 15 | −34.75 |
| 3 | 26 | 105.00 |
| 4 | 32 | 125.00 |
| 5 | 38 | −605.15 |

Numerical Embodiment 2

| Surface number | r | d | nd | vd | θgF | Effective diameter | Focal length |
|---|---|---|---|---|---|---|---|
| 1 | 270.17928 | 15.13046 | 1.433870 | 95.10 | 0.5373 | 130.169 | 407.710 |
| 2 | −507.30992 | 0.20171 | 1.000000 | 0.00 | 0.0000 | 129.580 | 0.000 |
| 3 | 195.46941 | 13.65616 | 1.433870 | 95.10 | 0.5373 | 124.249 | 481.146 |
| 4 | 2899.45736 | 9.30808 | 1.000000 | 0.00 | 0.0000 | 122.342 | 0.000 |
| 5 | −479.70303 | 3.00000 | 1.800000 | 29.84 | 0.6017 | 119.105 | −388.923 |
| 6 | 908.20312 | 0.96409 | 1.000000 | 0.00 | 0.0000 | 117.139 | 0.000 |
| 7 | 295.93269 | 11.79869 | 1.433870 | 95.10 | 0.5373 | 115.660 | 440.626 |
| 8 | −537.32876 | 1.45510 | 1.000000 | 0.00 | 0.0000 | 114.642 | 0.000 |
| 9 | 158.77485 | 11.37494 | 1.433870 | 95.10 | 0.5373 | 106.811 | 465.192 |
| 10 | 721.42143 | 2.11266 | 1.000000 | 0.00 | 0.0000 | 104.386 | 0.000 |
| 11 | 774.60480 | 7.65730 | 1.800000 | 29.84 | 0.6017 | 102.789 | 316.577 |
| 12 | −379.05422 | 2.20000 | 1.743198 | 49.34 | 0.5530 | 101.523 | −170.137 |
| 13 | 191.59077 | (Variable) | 1.000000 | 0.00 | 0.0000 | 95.371 | 0.000 |
| 14 | 306.46548 | 6.29897 | 1.720467 | 34.70 | 0.5834 | 46.492 | 98.717 |
| 15 | −92.63364 | 1.80000 | 1.772499 | 49.60 | 0.5521 | 44.594 | −41.170 |
| 16 | 49.20051 | 6.82093 | 1.000000 | 0.00 | 0.0000 | 38.932 | 0.000 |
| 17 | −97.47695 | 1.50000 | 1.595220 | 67.74 | 0.5442 | 38.473 | −82.245 |
| 18 | 99.61135 | 0.15000 | 1.000000 | 0.00 | 0.0000 | 37.660 | 0.000 |
| 19 | 69.28990 | 5.66183 | 1.800000 | 29.84 | 0.6017 | 37.640 | 59.953 |
| 20 | −154.06464 | 1.00000 | 1.496999 | 81.54 | 0.5374 | 37.136 | −175.321 |
| 21 | 202.36374 | 3.49735 | 1.000000 | 0.00 | 0.0000 | 36.056 | 0.000 |
| 22 | −62.48999 | 1.40000 | 1.595220 | 67.74 | 0.5442 | 36.038 | −82.553 |
| 23 | 235.75049 | (Variable) | 1.000000 | 0.00 | 0.0000 | 35.802 | 0.000 |
| 24 | 108.87034 | 6.22491 | 1.595220 | 67.74 | 0.5442 | 41.732 | 78.622 |
| 25 | −80.81998 | 1.50000 | 1.834000 | 37.16 | 0.5775 | 41.823 | −94.228 |
| 26 | 3721.87578 | 0.20000 | 1.000000 | 0.00 | 0.0000 | 42.359 | 0.000 |
| *27 | 204.87400 | 4.21540 | 1.583126 | 59.38 | 0.5423 | 42.639 | 143.950 |
| *28 | −142.08754 | (Variable) | 1.000000 | 0.00 | 0.0000 | 42.768 | 0.000 |
| 29 | 210.29170 | 4.22394 | 1.487490 | 70.23 | 0.5300 | 42.592 | 176.200 |
| 30 | −145.08052 | 0.20000 | 1.000000 | 0.00 | 0.0000 | 42.449 | 0.000 |
| 31 | 74.94026 | 1.50000 | 1.720467 | 34.70 | 0.5834 | 41.129 | −126.894 |
| 32 | 40.96106 | 7.05734 | 1.496999 | 81.54 | 0.5374 | 39.624 | 84.510 |
| 33 | 1398.05586 | (Variable) | 1.000000 | 0.00 | 0.0000 | 38.991 | 0.000 |
| 34 (Stop) | 0.00000 | 10.53028 | 1.000000 | 0.00 | 0.0000 | 28.093 | 0.000 |
| 35 | 126.06891 | 1.40000 | 1.882997 | 40.76 | 0.5667 | 23.147 | −62.020 |
| 36 | 38.13355 | 0.15000 | 1.000000 | 0.00 | 0.0000 | 22.330 | 0.000 |
| 37 | 28.91783 | 4.11703 | 1.805181 | 25.42 | 0.6161 | 22.279 | 35.238 |
| 38 | −2749.18415 | 1.09107 | 1.000000 | 0.00 | 0.0000 | 21.525 | 0.000 |
| 39 | −286.78566 | 1.50000 | 1.910820 | 35.25 | 0.5824 | 20.805 | −28.586 |
| 40 | 28.92117 | 33.00000 | 1.000000 | 0.00 | 0.0000 | 19.622 | 0.000 |
| 41 | 70.74415 | 6.88294 | 1.496999 | 81.54 | 0.5374 | 30.454 | 62.449 |
| 42 | −53.78764 | 5.53775 | 1.000000 | 0.00 | 0.0000 | 30.680 | 0.000 |
| 43 | −109.72301 | 4.00000 | 1.882997 | 40.76 | 0.5667 | 29.415 | −35.634 |
| 44 | 45.23886 | 8.00963 | 1.603420 | 38.03 | 0.5835 | 29.636 | 39.386 |
| 45 | −47.34010 | 0.15000 | 1.000000 | 0.00 | 0.0000 | 30.120 | 0.000 |
| 46 | −115.77129 | 5.47766 | 1.501372 | 56.42 | 0.5533 | 29.869 | 93.498 |

-continued

| | | | | | | | |
|---|---|---|---|---|---|---|---|
| 47 | −33.99699 | 3.00000 | 1.882997 | 40.76 | 0.5667 | 29.828 | −68.273 |
| 48 | −80.59641 | (BF) | 1.000000 | 0.00 | 0.0000 | 30.746 | 0.000 |
| Image plane | ∞ | | | | | | |

Aspherical surface data

Twenty-seventh surface

| | | |
|---|---|---|
| K = 1.58925e+001 | A4 = −7.43425e−007 | A6 = 1.04684e−010 |
| A8 = 2.14168e−013 | A10 = −8.73048e−016 | A12 = 1.85388e−018 |

Twenty-eighth surface

| | | |
|---|---|---|
| K = −1.09433e+001 | A4 = −3.39181e−007 | A6 = 3.00641e−010 |
| A8 = −2.80726e−013 | A10 = 1.32329e−016 | A12 = 1.13931e−018 |

Various data
Zoom ratio 15.00

| | Wide angle | Intermediate | Telephoto |
|---|---|---|---|
| Focal length | 60.00 | 240.00 | 900.00 |
| F number | 4.50 | 4.50 | 7.00 |
| Half angle of field | 14.53 | 3.71 | 0.99 |
| Image height | 15.55 | 15.55 | 15.55 |
| Total lens length | 458.15 | 458.15 | 458.15 |
| BF | 65.00 | 65.00 | 65.00 |
| d13 | 17.12 | 86.73 | 128.82 |
| d23 | 130.97 | 57.75 | 1.67 |
| d28 | 25.40 | 8.04 | 37.61 |
| d33 | 2.70 | 23.67 | 8.09 |

Zoom lens unit data

| Unit | First surface | Focal length |
|---|---|---|
| 1 | 1 | 245.59 |
| 2 | 14 | −34.00 |
| 3 | 24 | 110.00 |
| 4 | 29 | 105.00 |
| 5 | 34 | −361.71 |

Numerical Embodiment 3

| Surface number | r | d | nd | νd | θgF | Effective diameter | Focal length |
|---|---|---|---|---|---|---|---|
| 1 | 14683.19138 | 4.28544 | 1.487490 | 70.23 | 0.5300 | 100.000 | 1721.757 |
| 2 | −893.35269 | 0.70000 | 1.000000 | 0.00 | 0.0000 | 99.993 | 0.000 |
| 3 | 362.01860 | 11.51442 | 1.433870 | 95.10 | 0.5373 | 99.670 | 332.370 |
| 4 | −238.35968 | 0.35944 | 1.000000 | 0.00 | 0.0000 | 99.317 | 0.000 |
| 5 | −231.46543 | 2.50000 | 2.001000 | 29.13 | 0.5997 | 99.238 | −427.694 |
| 6 | −501.88128 | 8.57177 | 1.000000 | 0.00 | 0.0000 | 99.455 | 0.000 |
| 7 | 240.55692 | 10.07997 | 1.433870 | 95.10 | 0.5373 | 97.514 | 364.940 |
| 8 | −460.74683 | 0.20000 | 1.000000 | 0.00 | 0.0000 | 96.985 | 0.000 |
| 9 | 144.71298 | 12.03462 | 1.438750 | 94.93 | 0.5343 | 92.816 | 263.769 |
| 10 | −570.27449 | 2.40000 | 1.834000 | 37.16 | 0.5775 | 91.583 | −769.155 |
| 11 | −4898.86844 | 1.00000 | 1.000000 | 0.00 | 0.0000 | 90.227 | 0.000 |
| 12 | 619.25437 | 7.09837 | 1.800000 | 29.84 | 0.6017 | 88.390 | 265.204 |
| 13 | −324.96638 | 2.30000 | 1.772499 | 49.60 | 0.5521 | 87.309 | −178.464 |
| 14 | 242.19484 | (Variable) | 1.000000 | 0.00 | 0.0000 | 83.470 | 0.000 |
| 15 | −178.55461 | 1.20000 | 1.816000 | 46.62 | 0.5568 | 37.386 | −47.096 |
| 16 | 49.43883 | 5.59373 | 1.000000 | 0.00 | 0.0000 | 35.028 | 0.000 |
| 17 | −71.20411 | 1.20000 | 1.496999 | 81.54 | 0.5374 | 34.990 | −117.033 |
| 18 | 324.58556 | 0.10000 | 1.000000 | 0.00 | 0.0000 | 35.168 | 0.000 |
| 19 | 107.25329 | 6.59981 | 1.720467 | 34.70 | 0.5834 | 35.303 | 44.268 |
| 20 | −44.64885 | 1.20000 | 1.496999 | 81.54 | 0.5374 | 35.198 | −58.246 |
| 21 | 83.75158 | 0.10000 | 1.000000 | 0.00 | 0.0000 | 33.794 | 0.000 |
| 22 | 55.75224 | 2.24505 | 1.720467 | 34.70 | 0.5834 | 33.679 | 264.958 |
| 23 | 77.20356 | 3.84124 | 1.000000 | 0.00 | 0.0000 | 33.200 | 0.000 |
| 24 | −75.98380 | 1.20000 | 1.496999 | 81.54 | 0.5374 | 33.148 | −145.873 |
| 25 | 1696.98389 | (Variable) | 1.000000 | 0.00 | 0.0000 | 33.097 | 0.000 |
| 26 | 10721.79237 | 4.47902 | 1.516330 | 64.14 | 0.5352 | 38.162 | 122.892 |
| 27 | −64.06026 | 0.20000 | 1.000000 | 0.00 | 0.0000 | 38.506 | 0.000 |
| 28 | −66.50266 | 1.00000 | 1.720467 | 34.70 | 0.5834 | 38.514 | −107.550 |
| *29 | −453.51248 | 0.20000 | 1.000000 | 0.00 | 0.0000 | 39.451 | 0.000 |
| 30 | 102.12806 | 6.96953 | 1.438750 | 94.93 | 0.5343 | 40.558 | 98.351 |

-continued

| | | | | | | | |
|---|---|---|---|---|---|---|---|
| 31 | −73.48540 | (Variable) | 1.000000 | 0.00 | 0.0000 | 40.893 | 0.000 |
| 32 | 75.33389 | 5.78775 | 1.438750 | 94.93 | 0.5343 | 40.711 | 126.948 |
| 33 | −210.70991 | 0.20000 | 1.000000 | 0.00 | 0.0000 | 40.346 | 0.000 |
| 34 | 56.18515 | 1.00000 | 1.720467 | 34.70 | 0.5834 | 32.729 | −92.170 |
| 35 | 30.30107 | 7.72184 | 1.516330 | 64.14 | 0.5352 | 36.804 | 63.732 |
| 36 | 334.95037 | (Variable) | 1.000000 | 0.00 | 0.0000 | 36.043 | 0.000 |
| 37 (Stop) | 0.00000 | 3.42568 | 1.000000 | 0.00 | 0.0000 | 27.363 | 0.000 |
| 38 | −76.00199 | 1.00000 | 1.882997 | 40.76 | 0.5667 | 26.135 | −44.367 |
| 39 | 82.33763 | 4.78571 | 1.728250 | 28.46 | 0.6077 | 25.808 | 45.929 |
| 40 | −55.71617 | 1.50000 | 1.000000 | 0.00 | 0.0000 | 25.614 | 0.000 |
| 41 | −381.14533 | 1.00000 | 1.834807 | 42.73 | 0.5648 | 24.140 | −108.480 |
| 42 | 119.79483 | 0.50000 | 1.000000 | 0.00 | 0.0000 | 23.697 | 0.000 |
| 43 | 20.43624 | 3.50000 | 1.717362 | 29.50 | 0.6048 | 22.717 | 86.590 |
| 44 | 28.15792 | 1.69497 | 1.000000 | 0.00 | 0.0000 | 21.225 | 0.000 |
| 45 | 84.59384 | 1.00000 | 1.882997 | 40.76 | 0.5667 | 21.053 | −53.858 |
| 46 | 30.38613 | 35.00000 | 1.000000 | 0.00 | 0.0000 | 20.141 | 0.000 |
| 47 | −36.11799 | 4.82364 | 1.438750 | 94.93 | 0.5343 | 24.588 | 73.242 |
| 48 | −17.72245 | 1.00000 | 1.834807 | 42.73 | 0.5648 | 25.142 | −49.165 |
| 49 | −31.85952 | 0.50000 | 1.000000 | 0.00 | 0.0000 | 27.172 | 0.000 |
| 50 | 65.20672 | 1.00000 | 1.834807 | 42.73 | 0.5648 | 29.231 | −55.093 |
| 51 | 26.86796 | 6.87418 | 1.517417 | 52.43 | 0.5564 | 29.218 | 43.868 |
| 52 | −137.45767 | 0.50000 | 1.000000 | 0.00 | 0.0000 | 29.715 | 0.000 |
| 53 | 28.89595 | 3.99950 | 1.516330 | 64.14 | 0.5352 | 31.634 | 138.643 |
| 54 | 46.05030 | (BF) | 1.000000 | 0.00 | 0.0000 | 31.149 | 0.000 |
| Image plane | ∞ | | | | | | |

Aspherical surface data
Twenty-ninth surface

| | | |
|---|---|---|
| K = 1.99297e+002 | A4 = 8.40121e−007 | A6 = 5.66873e−010 |
| A8 = −1.71055e−012 | A10 = 4.35647e−015 | A12 = −3.59753e−018 |

Various data
Zoom ratio 10.00

| | Wide angle | Intermediate | Telephoto |
|---|---|---|---|
| Focal length | 50.00 | 200.00 | 500.00 |
| F number | 4.00 | 4.00 | 5.00 |
| Half angle of field | 17.28 | 4.45 | 1.78 |
| Image height | 15.55 | 15.55 | 15.55 |
| Total lens length | 376.01 | 376.01 | 376.01 |
| BF | 44.09 | 44.09 | 44.09 |
| d14 | 3.45 | 85.24 | 113.85 |
| d25 | 100.00 | 38.45 | 1.59 |
| d31 | 40.00 | 5.99 | 13.31 |
| d36 | 2.49 | 16.26 | 17.19 |

Zoom lens unit data

| Unit | First surface | Focal length |
|---|---|---|
| 1 | 1 | 205.00 |
| 2 | 15 | −34.50 |
| 3 | 26 | 110.50 |
| 4 | 32 | 80.00 |
| 5 | 37 | −159.71 |

Numerical Embodiment 4

| Surface number | r | d | nd | νd | θgF | Effective diameter | Focal length |
|---|---|---|---|---|---|---|---|
| 1 | 326.67857 | 15.75842 | 1.433870 | 95.10 | 0.5373 | 140.491 | 444.392 |
| 2 | −466.47547 | 0.70000 | 1.000000 | 0.00 | 0.0000 | 139.266 | 0.000 |
| 3 | 230.77526 | 14.96465 | 1.433870 | 95.10 | 0.5373 | 129.287 | 400.768 |
| 4 | −698.54118 | 1.00000 | 1.000000 | 0.00 | 0.0000 | 128.099 | 0.000 |
| 5 | −508.72076 | 4.00000 | 1.720467 | 34.70 | 0.5834 | 128.179 | −337.657 |
| 6 | 473.91513 | 7.39981 | 1.000000 | 0.00 | 0.0000 | 124.692 | 0.000 |
| 7 | 524.01780 | 9.36516 | 1.433870 | 95.10 | 0.5373 | 122.616 | 661.210 |
| 8 | −634.00814 | 0.15000 | 1.000000 | 0.00 | 0.0000 | 121.818 | 0.000 |
| 9 | 141.42849 | 15.45709 | 1.438750 | 94.93 | 0.5343 | 114.688 | 304.168 |
| 10 | −2394.32576 | 2.50000 | 1.720467 | 34.70 | 0.5834 | 113.156 | −1081.591 |
| 11 | 1167.46931 | 1.21229 | 1.000000 | 0.00 | 0.0000 | 111.049 | 0.000 |
| 12 | 1513.69755 | 4.90614 | 1.854780 | 24.80 | 0.6121 | 110.359 | 577.489 |
| 13 | −741.75658 | 2.20000 | 1.618000 | 63.33 | 0.5441 | 109.554 | −301.969 |

-continued

| | | | | | | | |
|---|---|---|---|---|---|---|---|
| 14 | 250.89124 | (Variable) | 1.000000 | 0.00 | 0.0000 | 104.471 | 0.000 |
| *15 | 399.99280 | 2.00000 | 1.816000 | 46.62 | 0.5558 | 53.397 | −73.464 |
| 16 | 52.24705 | 9.67114 | 1.000000 | 0.00 | 0.0000 | 47.225 | 0.000 |
| 17 | −68.98087 | 1.50000 | 1.595220 | 67.74 | 0.5442 | 47.360 | −68.812 |
| 18 | 102.52955 | 0.80000 | 1.000000 | 0.00 | 0.0000 | 45.877 | 0.000 |
| 19 | 136.99502 | 7.39188 | 1.720467 | 34.70 | 0.5834 | 45.875 | 65.381 |
| 20 | −70.89345 | 1.50000 | 1.595220 | 67.74 | 0.5442 | 45.622 | −65.260 |
| 21 | 87.27916 | 0.20000 | 1.000000 | 0.00 | 0.0000 | 43.852 | 0.000 |
| *22 | 61.79860 | 6.83810 | 1.720467 | 34.70 | 0.5834 | 43.785 | 69.887 |
| 23 | −269.03086 | 2.31018 | 1.000000 | 0.00 | 0.0000 | 43.138 | 0.000 |
| 24 | −70.70437 | 1.90000 | 1.595220 | 67.74 | 0.5442 | 43.311 | −66.658 |
| 25 | 92.05492 | (Variable) | 1.000000 | 0.00 | 0.0000 | 41.842 | 0.000 |
| 26 | 465.31833 | 4.92170 | 1.595220 | 67.74 | 0.5442 | 49.061 | 143.380 |
| 27 | −104.54692 | 0.20000 | 1.000000 | 0.00 | 0.0000 | 50.141 | 0.000 |
| 28 | −95.23894 | 1.80000 | 1.834000 | 37.16 | 0.5775 | 50.133 | −142.254 |
| *29 | −474.76565 | 0.20000 | 1.000000 | 0.00 | 0.0000 | 51.469 | 0.000 |
| 30 | 145.94554 | 8.21762 | 1.496999 | 81.54 | 0.5374 | 53.027 | 109.259 |
| 31 | −85.25411 | (Variable) | 1.000000 | 0.00 | 0.0000 | 53.316 | 0.000 |
| 32 | 103.02061 | 5.56834 | 1.595220 | 67.74 | 0.5142 | 52.181 | 150.827 |
| 33 | −703.36095 | 0.20000 | 1.000000 | 0.00 | 0.0000 | 51.803 | 0.000 |
| 34 | 89.83478 | 1.80000 | 1.720457 | 34.70 | 0.5834 | 50.110 | −110.447 |
| 35 | 41.99222 | 0.16549 | 1.000000 | 0.00 | 0.0000 | 47.460 | 0.000 |
| 36 | 42.51067 | 8.55432 | 1.496999 | 81.54 | 0.5374 | 47.468 | 82.867 |
| 37 | −1359.32426 | (Variable) | 1.000000 | 0.00 | 0.0000 | 47.086 | 0.000 |
| 38 (Stop) | 0.00000 | 2.50000 | 1.000000 | 0.00 | 0.0000 | 31.098 | 0.000 |
| 39 | −163.06739 | 1.60000 | 1.639999 | 60.08 | 0.5370 | 30.114 | −82.140 |
| 40 | 78.33421 | 0.10000 | 1.000000 | 0.00 | 0.0000 | 29.207 | 0.000 |
| 41 | 26.40020 | 4.11138 | 1.531717 | 48.84 | 0.5630 | 28.721 | 83.119 |
| 42 | 61.56760 | 0.96556 | 1.000000 | 0.00 | 0.0000 | 27.936 | 0.000 |
| 43 | 150.41160 | 1.60000 | 1.772499 | 49.60 | 0.5521 | 27.930 | −64.121 |
| 44 | 37.22289 | 21.33094 | 1.000000 | 0.00 | 0.0000 | 26.573 | 0.000 |
| 45 | 171.59368 | 1.60000 | 1.882997 | 40.76 | 0.5667 | 25.107 | −34.393 |
| 46 | 25.81664 | 6.10167 | 1.698947 | 30.13 | 0.6029 | 25.391 | 29.502 |
| 47 | −96.15077 | 21.91788 | 1.000000 | 0.00 | 0.0000 | 25.766 | 0.000 |
| 48 | 47.42133 | 2.60000 | 1.882997 | 40.76 | 0.5667 | 29.452 | −74.692 |
| *49 | 26.94011 | 3.46433 | 1.000000 | 0.00 | 0.0000 | 28.538 | 0.000 |
| 50 | 45.25765 | 8.84848 | 1.501372 | 56.42 | 0.5533 | 29.709 | 42.157 |
| 51 | −37.35449 | 1.60000 | 1.882997 | 40.76 | 0.5667 | 30.004 | −45.343 |
| 52 | −526.08631 | 0.20000 | 1.000000 | 0.00 | 0.0000 | 31.124 | 0.000 |
| 53 | 50.27100 | 11.66669 | 1.501372 | 56.42 | 0.5533 | 32.437 | 35.502 |
| 54 | −25.58199 | 1.60000 | 1.882997 | 40.76 | 0.5667 | 32.551 | −50.512 |
| 55 | −61.27756 | (BF) | 1.000000 | 0.00 | 0.0000 | 34.280 | 0.000 |
| Image plane | ∞ | | | | | | |

Aspherical surface data

Fifteenth surface

K = 9.56606e+000  A4 = −2.38525e−007  A6 = 3.05939e−010
A8 = 1.73334e−013  A10 = −4.06823e−016  A12 = 3.14889e−019

Twenty-second surface

K = 9.14684e−001  A4 = 3.44432e−007  A6 = −6.79631e−010
A8 = −1.94799e−014  A10 = 4.71804e−016  A12 = 6.96922e−019

Twenty-ninth surface

K = 1.77658e+001  A4 = 3.76174e−007  A6 = −3.85412e−011
A8 = 1.69970e−013  A10 = −2.14148e−016  A12 = 1.04959e−019

Fifty-second surface

K = −1.07821e+000  A4 = 5.89784e−007  A6 = −3.15957e−009
A8 = 1.97960e−011  A10 = −1.60622e−013  A12 = 2.81140e−016

Various data
Zoom ratio 20.00

| | Wide angle | Intermediate | Telephoto |
|---|---|---|---|
| Focal length | 50.00 | 200.00 | 1000.00 |
| F number | 4.50 | 4.50 | 7.50 |
| Half angle of field | 23.40 | 6.18 | 1.24 |
| Image height | 21.64 | 21.64 | 21.64 |
| Total lens length | 479.16 | 479.16 | 479.16 |
| BF | 61.37 | 61.37 | 61.37 |
| d14 | 1.21 | 74.31 | 125.17 |
| d25 | 141.34 | 55.50 | 0.84 |

-continued

|     |       |       |       |
| --- | ----- | ----- | ----- |
| d31 | 36.46 | 21.70 | 5.01  |
| d37 | 1.62  | 29.12 | 49.61 |

| Zoom lens unit data | | |
| --- | --- | --- |
| Unit | First surface | Focal length |
| 1 | 1  | 235.00 |
| 2 | 15 | −30.85 |
| 3 | 26 | 110.00 |
| 4 | 32 | 105.00 |
| 5 | 38 | −110.47 |

Numerical Embodiment 5

| Surface number | r | d | nd | vd | θgF | Effective diameter | Focal length |
| --- | --- | --- | --- | --- | --- | --- | --- |
| 1  | 307.55163    | 17.57143    | 1.433870 | 95.10 | 0.5373 | 149.996 | 451.344 |
| 2  | −533.39025   | 0.70000     | 1.000000 | 0.00  | 0.0000 | 149.539 | 0.000 |
| 3  | 283.38566    | 19.58639    | 1.433870 | 95.10 | 0.5373 | 144.216 | 367.735 |
| 4  | −359.52266   | 1.00394     | 1.000000 | 0.00  | 0.0000 | 142.980 | 0.000 |
| 5  | −350.09799   | 4.00000     | 1.720467 | 34.70 | 0.5834 | 142.255 | −339.417 |
| 6  | 833.68327    | 25.29114    | 1.000000 | 0.00  | 0.0000 | 138.659 | 0.000 |
| 7  | 277.14461    | 13.82768    | 1.433870 | 95.10 | 0.5373 | 129.141 | 522.598 |
| 8  | −1244.99211  | 0.20000     | 1.000000 | 0.00  | 0.0000 | 127.470 | 0.000 |
| 9  | 188.53605    | 12.94197    | 1.433870 | 95.10 | 0.5373 | 120.593 | 430.399 |
| 10 | −25989.26163 | 2.50000     | 1.720467 | 34.70 | 0.5834 | 118.771 | −1254.775 |
| 11 | 943.26663    | 2.94687     | 1.000000 | 0.00  | 0.0000 | 116.579 | 0.000 |
| 12 | 2527.57480   | 8.10238     | 1.761821 | 26.52 | 0.6135 | 115.129 | 447.924 |
| 13 | −398.00062   | 2.20000     | 1.618000 | 63.33 | 0.5441 | 113.597 | −239.450 |
| 14 | 237.48185    | (Variable)  | 1.000000 | 0.00  | 0.0000 | 107.043 | 0.000 |
| *15 | −425.16063  | 1.80000     | 1.754998 | 52.32 | 0.5476 | 46.002  | −120.203 |
| 16 | 116.26240    | 6.91604     | 1.000000 | 0.00  | 0.0000 | 43.489  | 0.000 |
| 17 | −77.43514    | 1.50000     | 1.595220 | 67.74 | 0.5442 | 41.934  | −71.657 |
| 18 | 96.39345     | 6.90387     | 1.720467 | 34.70 | 0.5834 | 40.434  | 56.038 |
| 19 | −68.17358    | 1.50000     | 1.000000 | 0.00  | 0.0000 | 40.005  | 0.000 |
| 20 | −70.21381    | 1.50000     | 1.595220 | 67.74 | 0.5442 | 38.049  | −57.436 |
| 21 | 67.62333     | 4.23715     | 1.720467 | 34.70 | 0.5834 | 35.815  | 92.341 |
| 22 | −6881.20455  | 2.86458     | 1.000000 | 0.00  | 0.0000 | 35.172  | 0.000 |
| 23 | −56.49108    | 1.40000     | 1.595220 | 67.74 | 0.5442 | 35.115  | −59.347 |
| 24 | 96.05248     | (Variable)  | 1.000000 | 0.00  | 0.0000 | 34.430  | 0.000 |
| 25 | 106.06442    | 7.16064     | 1.618000 | 63.33 | 0.5441 | 46.688  | 82.278 |
| 26 | −95.83925    | 0.12492     | 1.000000 | 0.00  | 0.0000 | 46.737  | 0.000 |
| 27 | −104.32654   | 1.50000     | 1.834000 | 37.16 | 0.5775 | 46.634  | −110.930 |
| *28 | 871.36349   | 0.20000     | 1.000000 | 0.00  | 0.0000 | 46.934  | 0.000 |
| 29 | 81.28697     | 5.70154     | 1.496999 | 81.54 | 0.5374 | 47.635  | 153.268 |
| 30 | −1240.33801  | (Variable)  | 1.000000 | 0.00  | 0.0000 | 47.512  | 0.000 |
| *31 | 123.98329   | 6.47892     | 1.487490 | 70.23 | 0.5300 | 47.027  | 118.458 |
| 32 | −106.91516   | 0.20000     | 1.000000 | 0.00  | 0.0000 | 46.694  | 0.000 |
| 33 | 319.00503    | 1.50000     | 1.720467 | 34.70 | 0.5834 | 44.905  | −124.926 |
| 34 | 70.43254     | 6.03125     | 1.496999 | 81.54 | 0.5374 | 43.469  | 119.239 |
| 35 | −369.81289   | (Variable)  | 1.000000 | 0.00  | 0.0000 | 42.874  | 0.000 |
| 36 (Stop) | 0.00000 | 8.63110   | 1.000000 | 0.00  | 0.0000 | 33.266  | 0.000 |
| 37 | 361.88964    | 1.40000     | 1.882997 | 40.76 | 0.5667 | 28.053  | −31.579 |
| 38 | 25.98178     | 5.71981     | 1.761821 | 26.52 | 0.6135 | 26.443  | 30.235 |
| 39 | −199.02059   | 3.00000     | 1.000000 | 0.00  | 0.0000 | 25.962  | 0.000 |
| 40 | −331.36717   | 1.50000     | 2.003300 | 28.27 | 0.5980 | 23.925  | −49.856 |
| 41 | 59.63035     | 30.00000    | 1.000000 | 0.00  | 0.0000 | 23.167  | 0.000 |
| *42 | 58.84110    | 4.66497     | 1.517417 | 52.43 | 0.5564 | 25.147  | 55.540 |
| 43 | −55.13321    | 0.75000     | 1.000000 | 0.00  | 0.0000 | 25.010  | 0.000 |
| 44 | −66.59470    | 4.00000     | 1.882997 | 40.76 | 0.5667 | 24.623  | −22.456 |
| 45 | 29.27488     | 6.36072     | 1.603420 | 38.03 | 0.5835 | 24.517  | 29.695 |
| 46 | −43.08869    | 1.50000     | 1.000000 | 0.00  | 0.0000 | 24.791  | 0.000 |

-continued

| | | | | | | | |
|---|---|---|---|---|---|---|---|
| 47 | −94.91780 | 4.20692 | 1.517417 | 52.43 | 0.5564 | 24.473 | 68.670 |
| 48 | −26.33176 | 3.00000 | 1.834807 | 42.71 | 0.5642 | 24.486 | −51.269 |
| 49 | −71.36289 | (BF) | 1.000000 | 0.00 | 0.0000 | 25.385 | 0.000 |
| Image plane | ∞ | | | | | | |

Aspherical surface data

Fifteenth surface

K = −1.85753e+002    A4 = 8.14403e−007    A6 = 8.72314e−011
A8 = 7.71433e−013    A10 = −1.72911e−015   A12 = 1.37509e−018

Twenty-eighth surface

K = 7.34242e+002     A4 = 3.16380e−007    A6 = 8.34068e−011
A8 = 3.51830e−013    A10 = 5.94163e−016    A12 = −4.65419e−019

Thirty-first surface

K = −6.36723e+000    A4 = −5.33965e−007   A6 = −4.59300e−011
A8 = 3.58485e−014    A10 = 1.31143e−016    A12 = −1.64997e−019

Forty-second surface

K = 3.06784e+000     A4 = 1.08776e−006    A6 = −1.98897e−009
A8 = 2.90074e−011    A10 = −1.43531e−013   A12 = 2.37788e−016

Various data
Zoom ratio 30.00

| | Wide angle | Intermediate | Telephoto |
|---|---|---|---|
| Focal length | 50.00 | 500.00 | 1500.00 |
| F number | 4.50 | 5.00 | 10.00 |
| Half angle of field | 15.64 | 1.60 | 0.53 |
| Image height | 14.00 | 14.00 | 14.00 |
| Total lens length | 520.83 | 520.83 | 520.83 |
| BF | 70.00 | 70.00 | 70.00 |
| d14 | 3.03 | 121.51 | 142.94 |
| d24 | 185.06 | 59.90 | 3.00 |
| d30 | 17.62 | 1.94 | 55.46 |
| d35 | 2.00 | 24.34 | 6.30 |

Zoom lens unit data

| Unit | First surface | Focal length |
|---|---|---|
| 1 | 1 | 270.00 |
| 2 | 15 | −32.50 |
| 3 | 25 | 103.00 |
| 4 | 31 | 113.50 |
| 5 | 36 | −88.23 |

Numerical Embodiment 6

| Surface number | r | d | nd | vd | θgF | Effective diameter | Focal length |
|---|---|---|---|---|---|---|---|
| 1 | 296.53152 | 4.00000 | 1.712995 | 53.87 | 0.5458 | 142.858 | −823.871 |
| 2 | 196.23701 | 1.00000 | 1.000000 | 0.00 | 0.0000 | 141.132 | 0.000 |
| 3 | 206.15767 | 17.70419 | 1.433870 | 95.10 | 0.5373 | 141.199 | 400.193 |
| 4 | −1089.16753 | 0.20000 | 1.000000 | 0.00 | 0.0000 | 140.948 | 0.000 |
| 5 | 356.13631 | 4.00000 | 1.743198 | 49.34 | 0.5530 | 139.269 | −277.640 |
| 6 | 130.41565 | 0.15000 | 1.000000 | 0.00 | 0.0000 | 134.928 | 0.000 |
| 7 | 129.45681 | 15.54802 | 1.433870 | 95.10 | 0.5373 | 135.092 | 446.030 |
| 8 | 374.92795 | 13.54253 | 1.000000 | 0.00 | 0.0000 | 134.873 | 0.000 |
| 9 | 155.29485 | 18.86311 | 1.433870 | 95.10 | 0.5373 | 135.785 | 339.935 |
| 10 | −2973.97397 | 0.20000 | 1.000000 | 0.00 | 0.0000 | 135.140 | 0.000 |
| 11 | 150.08297 | 14.42543 | 1.433870 | 95.10 | 0.5373 | 128.939 | 443.558 |
| 12 | 656.09723 | (Variable) | 1.000000 | 0.00 | 0.0000 | 127.278 | 0.000 |
| 13 | −1581.09064 | 1.80000 | 1.816000 | 46.62 | 0.5568 | 49.507 | −52.360 |
| 14 | 44.16547 | 9.90829 | 1.000000 | 0.00 | 0.0000 | 44.328 | 0.000 |
| 15 | −66.23190 | 1.50000 | 1.495999 | 81.54 | 0.5374 | 44.292 | −134.054 |
| 16 | −7582.68151 | 0.15000 | 1.000000 | 0.00 | 0.0000 | 44.615 | 0.000 |
| 17 | 78.57682 | 8.73981 | 1.720467 | 34.70 | 0.5834 | 44.922 | 53.821 |
| 18 | −73.96482 | 1.50000 | 1.496999 | 81.54 | 0.5374 | 44.520 | −88.827 |
| 19 | 111.05326 | 0.20000 | 1.000000 | 0.00 | 0.0000 | 42.214 | 0.000 |
| 20 | 46.38655 | 3.91260 | 1.720467 | 34.70 | 0.5834 | 41.294 | 171.759 |
| 21 | 71.27968 | 4.70907 | 1.000000 | 0.00 | 0.0000 | 40.158 | 0.000 |

-continued

| | | | | | | | |
|---|---|---|---|---|---|---|---|
| 22 | −116.93181 | 1.40000 | 1.595220 | 67.74 | 0.5442 | 40.105 | −76.194 |
| 23 | 74.84737 | (Variable) | 1.000000 | 0.00 | 0.0000 | 38.894 | 0.000 |
| 24 | 117.28808 | 6.98179 | 1.618000 | 63.33 | 0.5441 | 44.080 | 79.825 |
| 25 | −83.74630 | 0.15000 | 1.000000 | 0.00 | 0.0000 | 44.168 | 0.000 |
| 26 | −84.76803 | 1.50000 | 1.834000 | 37.16 | 0.5775 | 44.116 | −98.094 |
| *27 | 2888.86663 | 0.20000 | 1.000000 | 0.00 | 0.0000 | 44.583 | 0.000 |
| 28 | 99.34248 | 5.58632 | 1.496995 | 81.54 | 0.5374 | 45.190 | 139.777 |
| 29 | −228.91625 | (Variable) | 1.000000 | 0.00 | 0.0000 | 45.184 | 0.000 |
| 30 | 307.57238 | 4.08165 | 1.487490 | 70.23 | 0.5300 | 44.776 | 224.345 |
| 31 | −169.86545 | 0.20000 | 1.000000 | 0.00 | 0.0000 | 44.564 | 0.000 |
| 32 | 74.84159 | 1.50000 | 1.720467 | 34.70 | 0.5834 | 43.061 | −154.226 |
| 33 | 44.46471 | 0.85000 | 1.000000 | 0.00 | 0.0000 | 41.557 | 0.000 |
| 34 | 49.40372 | 6.01491 | 1.496999 | 81.54 | 0.5374 | 41.557 | −1.#I0 |
| 35 | 0.00000 | (Variable) | 1.000000 | 0.00 | 0.0000 | 41.124 | 0.000 |
| 36 (Stop) | 0.00000 | 10.52322 | 1.000000 | 0.00 | 0.0000 | 29.612 | 0.000 |
| 37 | 259.95225 | 1.40000 | 1.882997 | 40.76 | 0.5667 | 24.638 | −55.642 |
| 33 | 41.41924 | 0.15000 | 1.000000 | 0.00 | 0.0000 | 23.824 | 0.000 |
| 39 | 32.89909 | 4.21323 | 1.805181 | 25.42 | 0.6161 | 23.817 | 39.648 |
| 40 | −1471.23937 | 4.50275 | 1.000000 | 0.00 | 0.0000 | 23.144 | 0.000 |
| 41 | −204.34876 | 1.50000 | 1.910820 | 35.25 | 0.5824 | 20.271 | −31.947 |
| 42 | 34.31624 | 33.00000 | 1.000000 | 0.00 | 0.0000 | 19.376 | 0.000 |
| 43 | 63.14969 | 6.66912 | 1.496999 | 81.54 | 0.5374 | 30.326 | 63.166 |
| 44 | −60.58599 | 5.51773 | 1.000000 | 0.00 | 0.0000 | 30.552 | 0.000 |
| 45 | −92.46799 | 4.00000 | 1.882997 | 40.76 | 0.5667 | 29.451 | −32.760 |
| 46 | 43.31702 | 7.95980 | 1.603420 | 38.03 | 0.5835 | 29.922 | 39.436 |
| 47 | −49.82488 | 0.15000 | 1.000000 | 0.00 | 0.0000 | 30.512 | 0.000 |
| 48 | 162.75165 | 5.38663 | 1.501372 | 56.42 | 0.5533 | 30.317 | 69.768 |
| 49 | −44.29892 | 3.00000 | 1.882997 | 40.76 | 0.5667 | 30.107 | −61.901 |
| 50 | −235.34177 | (BF) | 1.000000 | 0.00 | 0.0000 | 30.447 | 0.000 |
| Image plane | ∞ | | | | | | |

Aspherical surface data
Twenty-seventh surface

K = 7.88437e+003   A4 = 3.70999e−007   A6 = 2.97099e−011
A8 = −1.13196e−013   A10 = 1.01136e−016   A12 = −4.55239e−020

Various data
Zoom ratio 20.00

| | Wide angle | Intermediate | Telephoto |
|---|---|---|---|
| Focal length | 40.00 | 400.00 | 800.00 |
| F number | 4.50 | 4.50 | 5.60 |
| Half angle of field | 21.24 | 2.23 | 1.11 |
| Image height | 15.55 | 15.55 | 15.55 |
| Total lens length | 488.14 | 488.14 | 488.14 |
| BF | 64.42 | 64.42 | 64.42 |
| d12 | 2.73 | 113.53 | 127.29 |
| d23 | 162.00 | 45.39 | 7.70 |
| d29 | 18.69 | 3.86 | 43.33 |
| d35 | 1.81 | 22.45 | 6.91 |

Zoom lens unit data

| Unit | First surface | Focal length |
|---|---|---|
| 1 | 1 | 205.00 |
| 2 | 13 | −34.00 |
| 3 | 24 | 105.00 |
| 4 | 30 | 125.00 |
| 5 | 36 | −317.30 |

TABLE 1

Values of conditional expressions (1) to (8) for Embodiments 1 to 6

| | Embodiment | | | | | |
|---|---|---|---|---|---|---|
| | 1 | 2 | 3 | 4 | 5 | 6 |
| fw | 50.0 | 60.0 | 50.0 | 50.0 | 50.0 | 40.0 |
| ft | 1,000.0 | 900.0 | 500.0 | 1,000.0 | 1,500.0 | 800.0 |
| f1 | 255.0 | 245.6 | 205.0 | 235.0 | 270.0 | 205.0 |
| f1f | 188.67 | 165.00 | 157.52 | 182.26 | 196.38 | −11,562.31 |
| f1r | −536.06 | −373.50 | −559.16 | −636.65 | −518.14 | 194.87 |

TABLE 1-continued

Values of conditional expressions (1) to (8) for Embodiments 1 to 6

| | Embodiment | | | | | |
|---|---|---|---|---|---|---|
| | 1 | 2 | 3 | 4 | 5 | 6 |
| β2w | −0.25 | −0.28 | −0.26 | −0.21 | −0.22 | −0.25 |
| β2t | −3.01 | −3.33 | −1.72 | −1.53 | −4.22 | −3.51 |
| β3w | −0.93 | −1.45 | −2.10 | −1.23 | −0.78 | −0.90 |
| β3t | −2.10 | −2.19 | −24.32 | 10.34 | −1.30 | −1.44 |
| β4w | 0.42 | 0.31 | 0.21 | 0.34 | 0.42 | 0.42 |
| β4t | 0.31 | 0.25 | 0.03 | −0.11 | 0.40 | 0.38 |
| β5 | 2.00 | 1.98 | 2.09 | 1.00 | 2.56 | 2.03 |
| UD1 | 89.95 | 78.86 | 63.04 | 79.61 | 110.87 | 89.63 |
| βcw | −0.79 | −0.88 | −0.92 | −0.42 | −0.84 | −0.77 |
| βct | −1.31 | −1.10 | −1.42 | −1.17 | −1.32 | −1.11 |
| βct/βcw | 1.66 | 1.26 | 1.54 | 2.80 | 1.57 | 1.44 |
| ft/fw | 20.00 | 15.00 | 10.00 | 20.00 | 30.00 | 20.00 |
| ωw | 17.28 | 14.53 | 17.28 | 23.40 | 15.64 | 21.24 |
| Conditional Expression | | | | | | |
| (1) | 0.17 | 0.08 | 0.19 | 0.34 | 0.13 | 0.12 |
| (2) | 3.92 | 3.66 | 2.44 | 4.26 | 5.56 | 3.90 |
| (3) | 64.29 | 57.88 | 32.15 | 46.22 | 107.16 | 51.46 |
| (4) | −0.35 | −0.44 | −0.28 | −0.29 | −0.38 | −59.33 |
| (5) | 0.35 | 0.32 | 0.31 | 0.34 | 0.41 | 0.44 |
| (6) | −0.25 | −0.20 | −0.26 | −0.21 | −0.22 | −0.25 |
| (7) | −4.95E−04 | −6.40E−04 | −7.37E−04 | −5.07E−04 | −4.78E−04 | −2.78E−04 |
| (8) | −1.30E−03 | −1.40E−03 | −1.08E−03 | −1.30E−03 | −1.31E−03 | −1.14E−03 |

(Image Pickup Apparatus)

Figure 13:
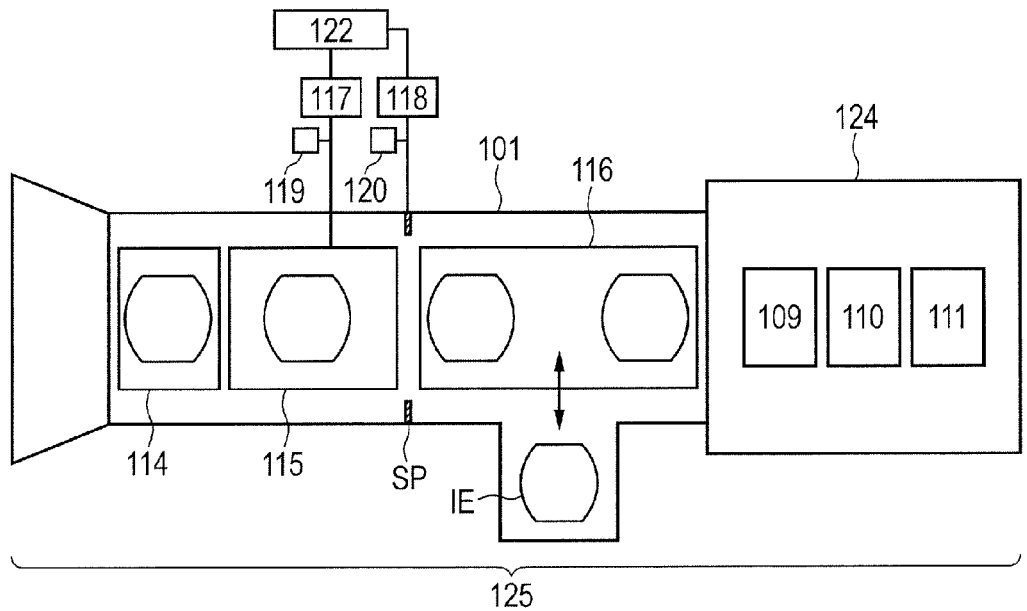
FIG. 13 is a schematic diagram of a main part of an image pickup apparatus according to the present invention.

Next, an image pickup apparatus using the zoom lens according to each embodiment as an image pickup optical system is described. FIG. 13 is a schematic diagram of a main part of an image pickup apparatus (television camera system) using the zoom lens according to each embodiment as an image pickup optical system. FIG. 13 illustrates a zoom lens 101, which is any one of the zoom lenses according to Embodiments 1 to 6.

The zoom lens 101 may be detachably mounted on a camera body 124, to thereby construct an image pickup apparatus 125. The zoom lens 101 includes a first lens unit 114, a zoom portion 115 that moves during zooming, and a lens unit 116 for imaging. Further, the zoom lens 101 includes an aperture stop SP. The lens unit 116 that does not move for zooming includes a zoom optical system IE, which is retractably insertable in an optical path.

The zoom portion 115 includes a drive mechanism for being driven in the optical axis direction. Drive units 117 and 118 such as motors electrically drive the zoom unit 115 and the aperture stop SP, respectively. Note that, the drive mechanism may be added to move all of the lens units 114, 115, and 116 or a part of each lens unit in the optical axis direction for focusing. Detectors 119 and 120 such as an encoder, a potentiometer, or a photosensor for detecting positions of the lens units in the zoom unit 115 on the optical axis and a stop diameter of the aperture stop SP. Note that, drive loci of the lens units in the zoom unit 115 may be mechanical loci by a helicoid, a cam, or the like, or electric loci by an ultrasonic motor or the like. In addition, the camera body 124 includes a glass block 109, which is equivalent to an optical filter or a color separation prism in the camera body 124. Further, the camera body 124 includes a solid-state image pickup element (photoelectrical transducer) 110, such as a CCD sensor or a CMOS sensor. The solid-state image pickup element 110 is configured to receive an object image formed by the zoom lens 101.

Further, CPUs 111 and 122 control the driving of the camera body 124 and the zoom lens 101, respectively. By applying the zoom lens according to the present invention to a television camera as described above, an image pickup apparatus having high optical performance may be implemented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-094609, filed May 1, 2014, which is hereby incorporated by reference herein in its entirety.

What is claimed is:

1. A zoom lens, comprising, in order from an object side to an image side:
   a first lens unit having a positive refractive power that does not move for zooming;
   a second lens unit having a negative refractive power that moves during zooming;
   a third lens unit having a positive refractive power that moves during zooming; and
   at least one lens unit having a positive refractive power, wherein the following conditions are satisfied:

$0.02 < LN(|\beta ct/\beta cw|)/LN(ft/fw) < 0.50$ $2.0 < ft/f1 < 7.0$ $20 < ft/(fw \times \tan \omega w) < 120$ where fw and ft represent focal lengths of the zoom lens at a wide angle end and a telephoto end, respectively, f1 represents the focal length of the first lens unit, ωw represents a maximum value of a half angle of field at the wide angle end, βct and βcw represent products of lateral magnifications of the third lens unit and lens units arranged on the image side of the third lens unit in a state in which focus is at respectively, and LN( ) in the conditional expression represents a natural logarithm of a numerical value in parentheses.

2. The zoom lens according to claim 1, wherein the first lens unit includes a front lens unit having a positive refractive power and including a negative lens, and a rear lens unit having a negative refractive power and including a positive lens and a negative lens, and satisfies the following condition:

$$-0.50 < f1f/f1r < -0.20$$

where $f1f$ represents a focal length of the front lens unit, and $f1r$ represents a focal length of the rear lens unit.

3. The zoom lens according to claim 1, wherein, of the lens units on the image side of the third lens unit, a lens unit that is closest to the image side comprises a lens unit having a positive refractive power that does not move for zooming.

4. The zoom lens according to claim 1, wherein the lens units on the image side of the third lens unit comprise a fourth lens unit having a positive refractive power that moves during zooming, and a fifth lens unit having a positive refractive power that does not move for zooming.

5. The zoom lens according to claim 1, wherein the following condition is satisfied:

$$-0.35 < \beta 2w < -0.15$$

where $\beta 2w$ represents a lateral magnification of the second lens unit in the state in which focus is at infinity at the wide angle end.

6. The zoom lens according to claim 1, wherein the following expression is satisfied:

$$-8.50 \times 10^{-4} < (\theta 2p - \theta 2n)/(\nu 2p - \nu 2n) < -2.00 \times 10^{-4}$$

where $\nu 2p$ and $\theta 2p$ represent average values of Abbe numbers and relative partial dispersions of convex lenses forming the second lens unit, respectively, and $\nu 2n$ and $\theta 2n$ represent average values of Abbe numbers and relative partial dispersions of concave lenses forming the second lens unit, respectively, provided that the Abbe number $\nu$ and the relative partial dispersion $\theta$ are expressed as:

$$\nu = (Nd-1)/(NF-NC)$$

$$\theta = (Ng-NF)/(NF-NC)$$

where Ng represents a refractive index in a g-Line, NF represents a refractive index in an F-Line, Nd represents a refractive index in a d-Line, and NC represents a refractive index in a C-Line.

7. The zoom lens according to claim 1, wherein the following expression is satisfied:

$$-1.80 \times 10^{-3} < (\theta 1p - \theta 1n)/(\nu 1p - \nu 1n) < -0.80 \times 10^{-3}$$

where $\nu 1p$ and $\theta 1p$ represent average values of Abbe numbers and relative partial dispersions of convex lenses forming the first lens unit, respectively, and $\nu 1n$ and $\theta 1n$ represent average values of Abbe numbers and relative partial dispersions of concave lenses forming the first lens unit, respectively, provided that the Abbe number $\nu$ and the relative partial dispersion $\theta$ are expressed as:

$$\nu = (Nd-1)/(NF-NC)$$

$$\theta = (Ng-NF)/(NF-NC)$$

where Ng represents a refractive index in a g-Line, NF represents a refractive index in an F-Line, Nd represents a refractive index in a d-Line, and NC represents a refractive index in a C-Line.

8. An image pickup apparatus, comprising:
a zoom lens, comprising, in order from an object side to an image side:
a first lens unit having a positive refractive power that does not move for zooming;
a second lens unit having a negative refractive power that moves during zooming;
a third lens unit having a positive refractive power that moves during zooming; and
at least one lens unit having a positive refractive power, wherein the following conditions are satisfied:

$$0.02 < LN(|\beta ct/\beta w|)/LN(ft/fw) < 0.50$$

$$2.0 < ft/f1 < 7.0$$

$$20 < ft/(fw \times \tan \omega w) < 120$$

where fw and ft represent focal lengths of the zoom lens at a wide angle end and a telephoto end, respectively, f1 represents the focal length of the first lens unit, $\omega w$ represents a maximum value of a half angle of field at the wide angle end, $\beta ct$ and $\beta cw$ represent products of lateral magnifications of the third lens unit and lens units arranged on the image side of the third lens unit in a state in which focus is at respectively, and LN( ) in the conditional expression represents a natural logarithm of a numerical value in parentheses; and
an image pickup element.

* * * * *